(12) United States Patent
Wetherall et al.

(10) Patent No.: US 11,475,075 B2
(45) Date of Patent: *Oct. 18, 2022

(54) INTEGRATION OF CONTENT AND RECORDS MANAGEMENT SYSTEMS

(71) Applicant: Alfresco Software, Inc., San Mateo, CA (US)

(72) Inventors: Roy Wetherall, Sydney (AU); Tuna Aksoy, Maidenhead (GB)

(73) Assignee: HYLAND UK OPERATIONS LIMITED, Maidenhead (GB)

( * ) Notice: Subject to any disclaimer, the term of this patent is extended or adjusted under 35 U.S.C. 154(b) by 260 days.

This patent is subject to a terminal disclaimer.

(21) Appl. No.: 16/190,699

(22) Filed: Nov. 14, 2018

(65) Prior Publication Data
US 2019/0079931 A1    Mar. 14, 2019

Related U.S. Application Data

(63) Continuation of application No. 14/527,718, filed on Oct. 29, 2014, now Pat. No. 10,169,341.

(60) Provisional application No. 62/065,567, filed on Oct. 17, 2014.

(51) Int. Cl.
| | |
|---|---|
| G06F 16/20 | (2019.01) |
| G06F 16/93 | (2019.01) |
| G06F 16/13 | (2019.01) |
| G06F 16/16 | (2019.01) |
| G06F 16/28 | (2019.01) |
| G06F 3/04817 | (2022.01) |
| G06F 3/0482 | (2013.01) |

(52) U.S. Cl.
CPC ............ *G06F 16/93* (2019.01); *G06F 3/0482* (2013.01); *G06F 3/04817* (2013.01); *G06F 16/13* (2019.01); *G06F 16/168* (2019.01); *G06F 16/285* (2019.01)

(58) Field of Classification Search
None
See application file for complete search history.

(56) References Cited

U.S. PATENT DOCUMENTS

| | | | |
|---|---|---|---|
| 8,424,097 B2 | 4/2013 | Uchikawa et al. | |
| 2003/0236788 A1* | 12/2003 | Kanellos | G06F 16/20 |
| 2005/0047645 A1* | 3/2005 | Funk | G05B 19/41865 382/145 |
| 2006/0230044 A1 | 10/2006 | Utiger | |
| 2007/0033200 A1* | 2/2007 | Gillespie | G06Q 10/10 |
| 2007/0208785 A1 | 9/2007 | Hayashi et al. | |
| 2008/0086506 A1 | 4/2008 | DeBie et al. | |
| 2008/0154970 A1* | 6/2008 | DeBie | G06F 16/178 |
| 2008/0155652 A1 | 6/2008 | DeBie | |

(Continued)

*Primary Examiner* — Jau Shya Meng
(74) *Attorney, Agent, or Firm* — Mintz, Levin, Cohn, Ferris, Glovsky and Popeo, P.C.; F. Jason Far-hadian, Esq.

(57) ABSTRACT

Systems and methods for providing access to a document within a first file structure for one or more users of a content management system. Location for the content object within a file plan of a records management system is provided, in response to detecting a declaration of the document as a record. The content object is moved from the first file structure to the location in the file plan. A record marker is created in the first file structure to identify a navigation path from the first file structure to the location of the content object in the file plan.

20 Claims, 27 Drawing Sheets

(56) References Cited

U.S. PATENT DOCUMENTS

| | | |
|---|---|---|
| 2011/0218995 A1* | 9/2011 | Ayars .................... G06F 16/00 |
| | | 707/E17.089 |
| 2014/0297687 A1* | 10/2014 | Lin ................... G06F 16/24524 |
| | | 707/779 |
| 2015/0100547 A1 | 4/2015 | Holmes-Higgin et al. |
| 2015/0100548 A1 | 4/2015 | Mc Erlean et al. |
| 2015/0101021 A1 | 4/2015 | Mc Erlean et al. |
| 2016/0110370 A1 | 4/2016 | Wetherall et al. |
| 2016/0110371 A1 | 4/2016 | Wetherall et al. |
| 2016/0110374 A1 | 4/2016 | Wetherall et al. |

\* cited by examiner

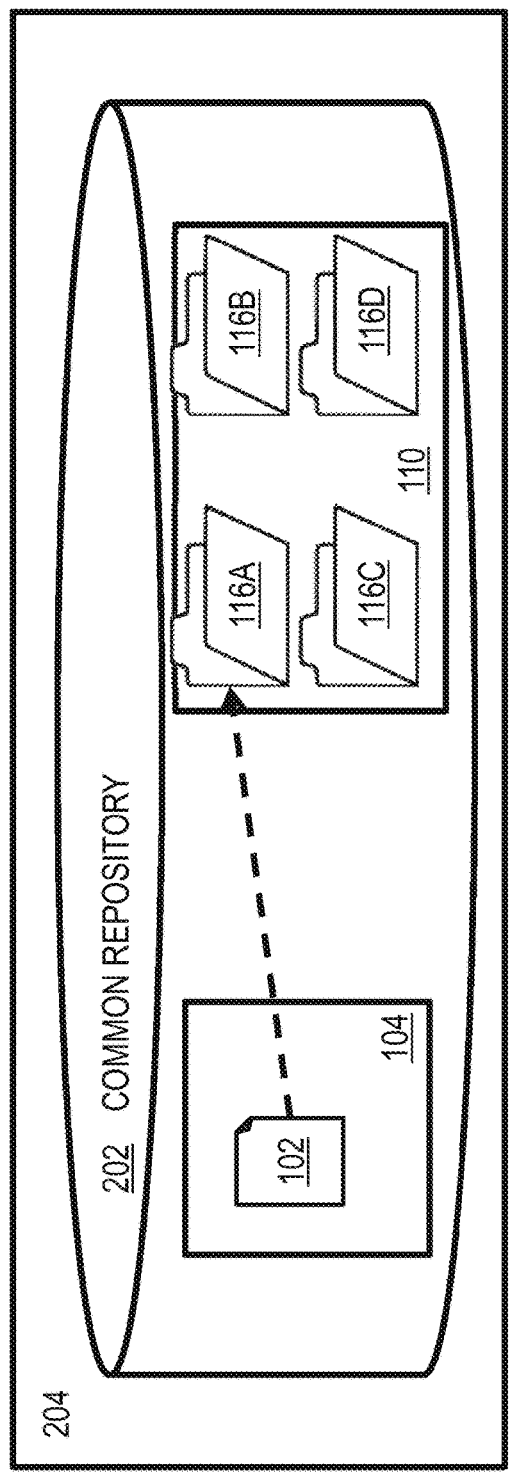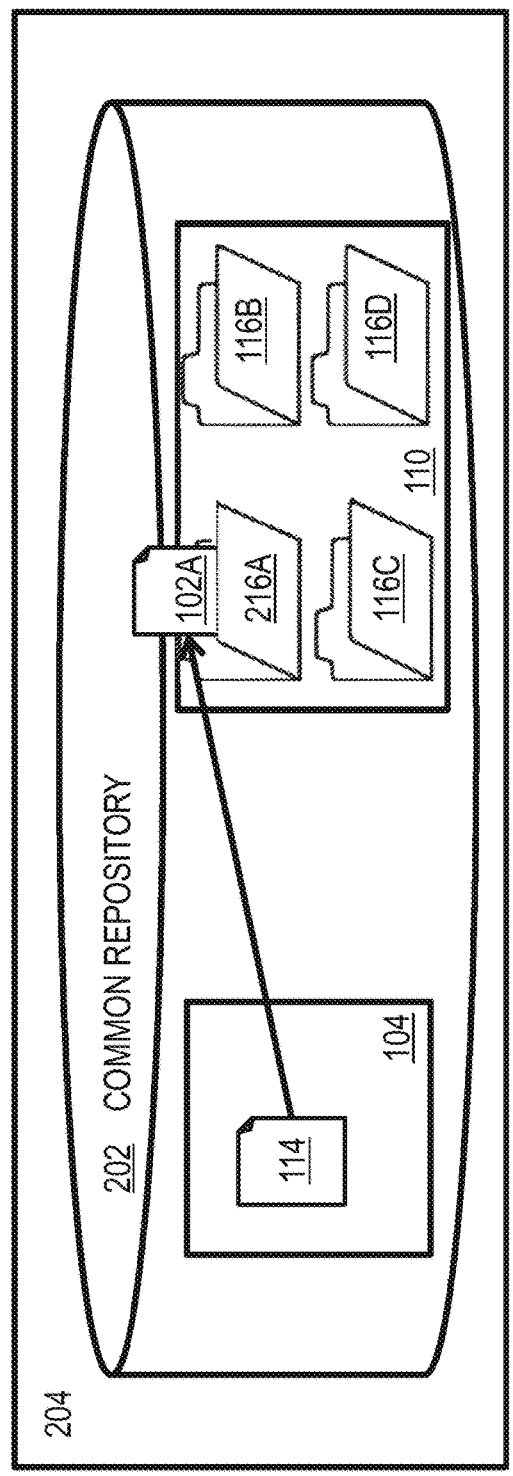
FIG. 2A
FIG. 2B

INTEGRATION OF CONTENT AND RECORDS MANAGEMENT SYSTEMS

CROSS-REFERENCE TO RELATED APPLICATIONS

The current application claims priority to U.S. application Ser. No. 14/527,718 filed on Oct. 29, 2014, which in turn claims priority to U.S. Provisional Application No. 62/065,567 filed on Oct. 17, 2014. The current application is also related to co-pending and co-owned U.S. patent applications Ser. Nos. 14/170,369, 14/170,364, and 14/170,323. The content of all the above-referenced applications is incorporated by reference herein in entirety.

TECHNICAL FIELD

The subject matter described herein relates to content management systems and record management systems. Some implementations of the current subject matter relate in particular to an integrated approach to content and records management.

BACKGROUND

Records management (RM) generally refers to approaches to controlling and governing key records of an organization (e.g. an enterprise, a company, a university, or the like, including subordinate organizations within other organization) throughout the lifecycle of a record, which includes the period from when a record is first created by or provided to an organization to the eventual disposal of the record. Elements of records management can include identifying, classifying, prioritizing, storing, securing, archiving, preserving, retrieving, tracking, and destroying of records. These activities are typically part of a broader set of requirements associated with governance, risk, and compliance (GRC) activities performed by the organization, and are generally related to maintaining and securing records and evidence of the organization's business activities, etc. as well as the reduction or mitigation of risk that may be associated with such evidence.

Records management can be a crucial function within an organization, but also one that can be difficult to implement due to added burdens placed on users by requirements for compliance with records management protocols. Well-implemented approaches to records management can provide benefits such as improving efficiency and productivity, ensuring regulatory compliance, minimizing litigation risks, safeguarding important (or even vital) information, supporting improved decision making by an organization's management, preserving the organization's institutional memory, fostering improved document organization, etc. However, these benefits can be difficult to achieve for various reasons, including the reliance of many aspects of existing records management approaches upon a certain level of training, adoption, and regular implementation of a set of records management procedures by users at the organization. If users do not properly adopt and implement the necessary procedures, a records management approach can fail to achieve the various goals and to provide the intended benefits. Alternatively, hard enforcement of records management procedures in a manner that ensures compliance but that requires additional user actions beyond normal day to day work can hinder productivity as users are required to carry extra workload, and thereby devote time and attention to these extra tasks that could be more productively used for other tasks, simply to comply with such procedures.

As used herein, the term "record" refers generally to something that represents proof of existence and that can be used to recreate or prove state of existence, regardless of medium or characteristics. A record can be created or received by an organization in pursuance of or compliance with legal obligations, in the transaction of business, etc. A record can be a tangible object, such as a paper document (e.g. a birth certificate; a driver license; a physical copy of a medical x-rays, a contract, etc.) or digital information, such as electronic office documents, data in application databases, web site content, and electronic mail (email). Unlike tangible records, however, with digital records it can be more difficult to ensure authenticity, reliability, trustworthiness, etc. For example, the absence of a tangible equivalent of a digital information record can complicate processes for preserving and protecting the content, the context, the structure, etc. of such records.

Once a record is created, one or more of an owner of the record, a records repository, an authorized user, a records management team member, or the like can set records controls to regulate access to and distribution of the record. Records controls, as referred to herein, can include one or more records management policies, procedures, rules, etc., which can pertain to access privileges, records lifecycle management, and the like. For example, privileges can be set (e.g. by an administrator, manager, etc.) on a repository to allow users having certain roles to access particular records stored in the repository. Lifecycle management, records management, or other software-based architectures can be used to identify original records, versions of records, copies of records, and distribution histories of records. Records maintenance can be accomplished by formally and discretely identifying records (e.g. by coding and storing records in folders or other file plan hierarchies specifically designed for protection and storage capacity, by informally identifying and filing without indexing, or by other approaches.

Content management is a related field to records management. However, the two approaches are not always compatible and are sometimes at odds with one another. A content management system (CMS) suitable for managing the various content items that an organization produces or receives, retains or otherwise stores, manipulates or modifies, etc. can support the requirements of one or more applications, and optionally other requirements, to provide a coherent solution in which content and management processes are capable of accessing content across a variety of applications subject to access controls, permissions, and the like. Content items managed by a content management system can include one or more of files, documents, images, photos, Web pages, records, XML documents, other unstructured or semi-structured files, etc., as well as directory structures such as folders, file trees, file plans, or the like, which can provide organization for multiple content items in addition to storing or otherwise representing relationships between content items, etc. For simplicity, the term "document" is used generically herein to refer to all types of content items handled by a content management system, while "record" refers to a content item that has been put under the control of a records management system.

A content management system can manage one or more of the actual digital content of a document, the metadata that describes a context of the document, associations between the document and other content or documents, a place and classification of the document in a repository, indexes for finding and accessing documents, etc. The content management system can also manage processes and lifecycles of documents to ensure that this information is correct. The content management system can also manage one or more workflows for capturing, manipulating, editing, storing, and distributing documents, as well as the lifecycle for how long a document will be retained and what happens after that retention period.

A content management system for use in enterprise content management can include one or more of document management tools, applications, and interfaces to support general office work, search, and discovery. Workflow management capabilities of a content management system can support various business processes, optionally including, but not limited to, case management and review and approval. Collaboration applications and services of a content management system can support the collaborative development of information and knowledge in the creation and refinement of content and documents. Web content management services of a content management system, which can be scalable, can support the delivery and deployment of content and documents from the enterprise to users (e.g. end users of content, customers of the enterprise, etc.). Records management capabilities of a content management system can capture and preserve records based upon government-approved or other standards. A standards-based platform can also provide access to applications that use these standards, such as publishing, image management, email management, etc.

Currently available approaches to coordinating records management with content management systems typically involve moving a document from a content management system repository to a records management repository when the document is designated or otherwise classified as a record. A records management team can manage policies for the records retained at the records management repository. However, such an approach can have the undesirable effect of requiring users to understand operation and navigation of a separate records management system to access documents that they had previously authored, accessed, modified, had read permissions for, etc. on the content management system after those documents are designated as records and moved to the separate records management system.

Other approaches involving "in-place" records management can include leaving documents in existing locations on one or more content management systems but placing control for the documents under the control of a separate records management system that includes a common data model configured to interact with the architectures of the one or more content management systems and to define and enforce records management policies on data, documents, etc. in the different data storage systems. Such an approach can be useful from the perspective of a records management team, for example because use of a common data model requires a records manager to understand only a single data model. However, such an approach can still require extraction of documents from one or more content management systems to a secured records management repository to perform important records management functions such as legal holds, archiving, and the like.

SUMMARY

In light of the above-mentioned deficiencies in existing approaches to records management, improved integration solutions between content management approaches and records or lifecycle management approaches are desirable.

In accordance with one or more embodiments, systems and methods for providing access to a document within a first file structure for one or more users of a content management system. Location for the content object within a file plan of a records management system is provided, in response to detecting a declaration of the document as a record. The content object is moved from the first file structure to the location in the file plan. A record marker is created in the first file structure to identify a navigation path from the first file structure to the location of the content object in the file plan.

Consistent with one or more implementations of the current subject matter, an "in-place" records management approach can include in-place declaration of a record. In other words, a document within a document library or other first file structure associated with a content management system or application can be declared as a record such that records management controls are set for the document. The setting of the records management controls can include replacing the document in the first file structure (e.g. a document library or the like) with a record marker while the document itself, now designated as a record, is relocated to a second file structure associated with a record management system or application. The record marker allows users of the content management system or application who had access to the document prior to its designation as a record to be able to access the corresponding record from within the content management system or application (e.g. without needing to use a separate records management system or application).

Various aspects of the currently disclosed subject matter are capable of providing such features in addition to providing other possible advantages and benefits, which can include, but are not limited to, isolating a content authoring environment (e.g. a user interface and other functionality of a content management system or application) from a records management environment, minimizing impacts on the ways in which users work with content, allowing users to interact with an integrated content management and records management system without requiring understanding of the details of the records management working practices, keeping records available to users within their authoring environment while the records management team has full control, and the like.

In one aspect of the current subject matter, a method includes causing a content object to undergo one or more modifications initiated by one or more users of a content management system. The content object includes content and metadata of a document maintained by the content management system within a first file structure. The method also includes providing access to the document for the one or more users of the content management system via the first file structure, detecting declaration of the document as a record, assigning a location for the content object as a record within a file plan of a records management system after the detecting of the declaration of the document as the record, maintaining the access to the content item via the first file structure such that the one or more user can continue to interact with the content object via a user interface of the content management system, and sending a notification to a records manager regarding the declaration of the document as the record.

In optional variations, one or more of the following features can be included in any feasible combination. The notification can include at least one of a link to the location of the record, a first option to request more information about the record from the one or more users, and a second option to reject the record. The user interface of the content management system can be changed after detecting declaration of the document as a record such that a display of information relating to the content object in the user interface includes a unique record identifier and an icon visually depicting that the document has been declared as the record. The changing of the user interface can further include removing one or more previously available actions that were applicable to the document in the content management system. The content object can be originated as the document, and the originating can include at least one of creation of a new document, copying of an existing document or importing of an existing document from another system into the first file structure of the content management repository. Prior to the assigning of the location, the operations can further include holding the record in an unfiled records folder and performing one or more other actions that can include at least one of completing the record, adding additional metadata, requesting more information from the one or more users, and rejecting the record. User permissions can be maintained for access to the content object subject to an original set of permissions within the content management system modified by one or more records management policies applied to the content object as a result of its designation as the record. The declaration of the document as a record can include at least one of a manual declaration received via a user interaction with a user interface of the content management system, and an automated declaration resulting from occurrence of a trigger event or action defined by a rule.

In another interrelated aspect of the current subject matter, a method includes moving a content object that includes content and metadata of a document maintained within a content management system of an organization into an unfiled records folder of a records management system of the organization. The moving occurs when the document is declared as a record. The content object is evaluated to determine a location within a file plan of the records management system to which the content object is to be moved, and the content object is moved from the unfiled records folder to the location. A record marker in the content management system is updated to provide access from a first file structure of the content management system to the location such that users of the content management system having access permissions for the document can access the content object subject to the access permissions and one or more records management policies enforced by the records management system.

In optional variations, one or more of the following features can be included in any feasible combination. The record marker can be created in the content management system upon the moving of the content object to the unfiled records folder. Declaring of the document as the record can occur within the content management system. The declaring of the document as the record can include at least one of a manual declaration received via a user interaction with a user interface of the content management system, an automated declaration resulting from occurrence of a trigger event or action defined by a rule, and a automated designation resulting from a workflow relating to the document. The evaluating of the content object can include at least one of extracting content from the content object, extracting the content from the content object and performing a semantic analysis of the content, evaluating original object metadata associated with the content object evaluating a record tag added to the content object upon declaration of the document as the record, and evaluating additional record metadata added to the content object after declaration of the document as the record. The location can include a file path that comprises a fixed path information and configurable path information determined by the evaluating of the content object. The file plan can include one or more record categories, and the location can be assigned to a record folder within a record category of the one or more record categories. The record category can include a retention and disposition schedule, which apply to the record as well as to all other records present within the category and within the record folder.

In yet another interrelated aspect of the current subject matter, a method includes detecting an occurrence of a trigger action or event relating to a content object maintained within a content management system of an organization, executing the records management rule in response to the detecting such that the content object is declared as a record automatically, moving the content object from a first file structure of the content management system to a second file structure of a records management system, and retaining access to the content object via the content management system. The trigger action or event is defined by a records management rule.

In optional variations, one or more of the following features can be included in any feasible combination. The content object can be placed under control of the records management system. The second file structure can include a file plan. The moving of the content object can include changing a primary association for the content object to a new location in the second file structure, and the retaining of access to the content object can include creating a secondary association for the content objection to an original location of the content object in the first file structure. The retaining of access to the content object can include creating a record marker in the first file structure such that a navigation path to the content object via the first file structure remains unchanged from prior to the content object being declared as a record. The retaining of access can include providing access to the content object to a user of the content management system subject to one or more permissions the user possessed for the content object prior to the content object being declared as the record. The trigger action or event can include at least one of movement of the content object into a specified folder in the first file structure, completion of a specified task of a workflow involving the content object, a time-based event, and a specified user interface action relating to the content object. A record tag and additional record metadata can be added to the content object. The additional record metadata can include at least one of a type of content in the content object, and an aspect comprising a custom metadata tag to be assigned to the record. The custom metadata tag can include information usable for at least one of searching of the document, filing of the document, creation of a dynamic file plan portion for the record, and rules-based filing of the record in the second file structure.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to enterprise resource software systems, content management systems, enterprise content management systems, records management systems, lifecycle management systems, and other business software solutions or architectures, it should be readily understood that such features are not intended to be limiting unless otherwise expressly stated or implicitly required by the context of the description of such features. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2A shows another computing architecture including data structures and other components that can be included in one or more implementations of the current subject matter;

FIG. 2B shows a second view of the computing architecture of FIG. 2A after designation of a document as a record;

When practical, similar reference numbers denote similar structures, features, or elements.

DETAILED DESCRIPTION

Figure 1B:
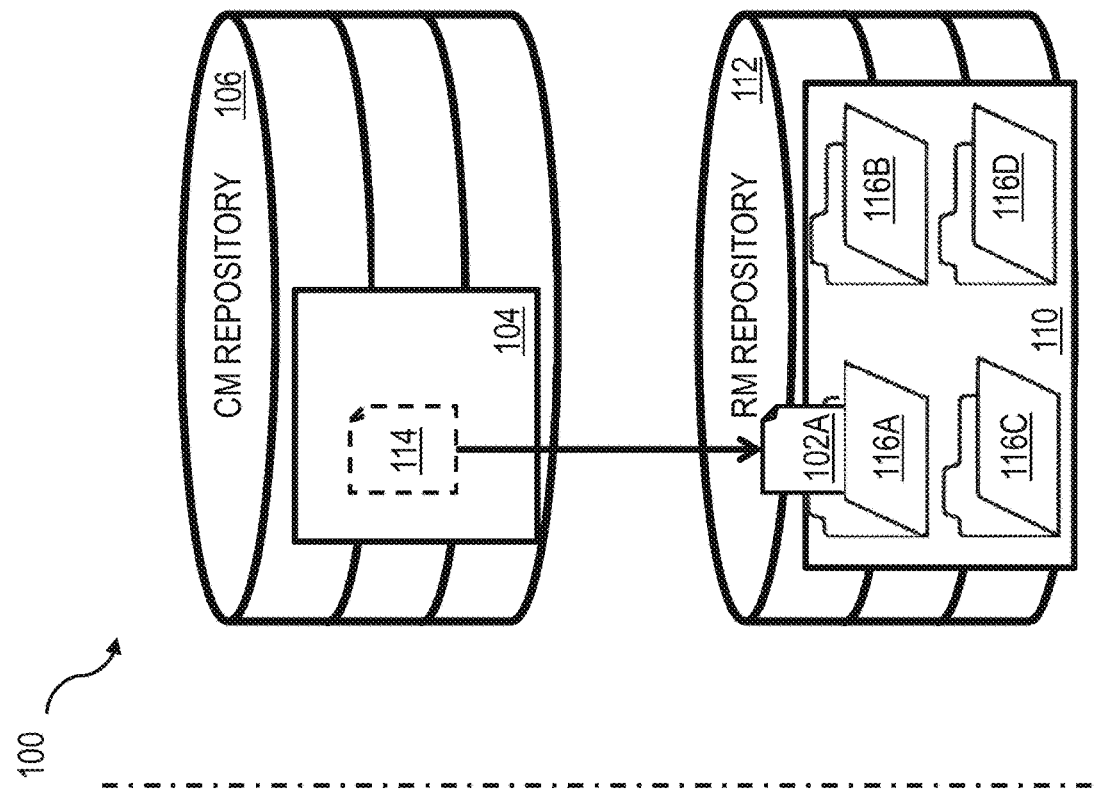
FIG. 1B shows a second view of the computing architecture of FIG. 1A after designation of a document as a record.

As noted above, implementations of the current subject matter can provide an "in-place" records management approach in which documents in a content management system can be seamlessly and transparently designated and handled as records within a user framework that facilitates appropriate levels of access and control for both document users (e.g. content creators, manipulators, reviewers, etc.) and records managers. Such benefits can be achieved by improvements to document filing, handling, and control, among other features. Any or all of levels of access, permissions, disposition scheduling, filing, control, and the like for records in a records management system are referred to generically herein as records controls.

Unless contradicted explicitly or by context, descriptions of content management systems and records management systems used herein generally apply to both "on-premises" and "cloud-based" installations of software functionality providing one or more of the described features. On-premises refers to a software installation that runs on one or more servers within an organization's network and that is optionally protected from access by users outside of the organization by a firewall. Cloud-based refers to a software installation that runs on one or more servers that are accessible via a wide area network (e.g. the Internet) and not protected by an organization's firewall. It will also be understood that references to systems (e.g. a content management system, a records management system, etc.) are intended to include to the software functionality of such installations and/or the programmable processors upon which the software functionality is implemented. In other words, in some implementations of the current subject matter, a system need not be not restricted to specific machines unless explicitly stated or otherwise required by the context in which the term is used. As an example, the terms content management system and records management system can optionally refer to software solutions implemented on one or more server machines, which can be located either inside or outside of an organization's network and/or firewall. Such software solutions may also be referred to as content management applications and records management applications, or similar terms. The terms content management system and records management system can also or alternatively refer to one or more computing systems that include programmable processors or other computing hardware and that execute software or other programming to implement at least some of the functions discussed herein.

At least one content management repository (e.g. a database storing content items, metadata about the content items, etc.) can be part of a content management system. In certain implementations of the current subject matter, the content management repository can also function as a records management repository storing records, metadata about records, and the like as a part of a records management system. In other implementations of the current subject matter, content management repository and records management repository functionality can be provided by two separate repository structures. The term repository can refer to the data structure within which content maintained by an associated content and/or records management system is stored. Alternatively or in addition, a repository can include a physical storage medium (e.g. one or more hard drives, solid state drives, random access memory modules, optical drives, magnetic drives, or other physical media) and the data structure stored on the physical medium.

In some implementations of the current subject matter, filing (e.g. organization) of records in a records management repository of a records management system can be based on a file plan, which can be visualized as an outline or other file structure that includes the records series, file organization, active file locations, file transfer instructions, file retention and disposition instructions, and other specific instructions that provide guidance for effective management of records. A file plan is an example of a second file structure (discussed in more detail below) that can be employed within a record management system. This second file structure can be a different file structure than a first file structure (also discussed in more detail below) of a content management system. In general, a file plan specifies how records are to be organized once they have been created or received, provides a "roadmap" to the records created and maintained by an organizational unit, and facilitates dispositioning (e.g. transferring to long term storage, deleting, etc.) of the records. A file plan can include multiple hierarchical levels, for example one, two, three, or even more. Records disposition can be performed according to records controls that can be enabled at different levels of the file plan hierarchy and inherited according to the hierarchy structure. For example, a schedule at a first level of the file plan hierarchy can be inherited to documents, folders, etc. at a second, subordinate level of the file plan hierarchy.

Implementations of the current subject matter can support multiple records management "sites" created natively within a content management system, for example within an on-premises content management system installation or within a cloud-based tenant or client site offering access to a content management system installation via a software-as-a service (SaaS) arrangement. A records management site refers to a part of a repository designated for keeping records that have some relation to one another, such as for example originating from one organization or sub-organization, relating to a specific topic or field, or the like. Alternatively or in addition, each of multiple records management sites can have a different set of records controls. For example, if more than one records management site is hosted within a same content management system installation, users, security, and other records management aspects can be administered separately for each records management site. Support of one or more integrated, in-place records management sites within a content management system installation can enable in-place filing of records by users from within a collaboration site or other typical content management system document access portal as discussed in greater detail below. Additionally, by maintaining records in place, a user of a collaboration site that is part of a content management system can continue to access a document designated as a record consistent with the permissions in place for the document before its designation as a record, subject to any additional records management policies, etc.

Use of a single platform for both records management and content management consistent with implementations of the current subject matter can allow users to put any kind of content object (e.g. a digital file that includes content and/or metadata) under management, including social media, collaborative content and multimedia files. This capability can be referred to as hybrid enterprise content management (ECM), and can facilitate collaboration across an extended enterprise, while simultaneously ensuring the proper controls and compliance necessary for records management. In addition, a hybrid enterprise content management system can integrate and support hybrid workflows that can support business processes of all types, including those that traverse both cloud and on-premises content management system environments. Illustrative examples of approaches including such features are described in co-pending and co-owned U.S. patent applications Ser. Nos. 14/170,369, 14/170,364, and 14/170,323, respectively entitled Hybrid Synchronization Between Cloud and On-Premise Systems in a Content Management System, Linking of Content Between Installations of a Content Management System, and Hybrid Workflow Synchronization Between Cloud and On-Premises Systems in a Content Management System, the disclosures of which are incorporated herein by reference. In this manner, a hybrid enterprise content management approach including one or more of the features described herein can allow collaboration across one or more firewalls or between users of two separate content management systems while also enabling enforcement of records management compliance with minimal impact on users.

Figure 1A:
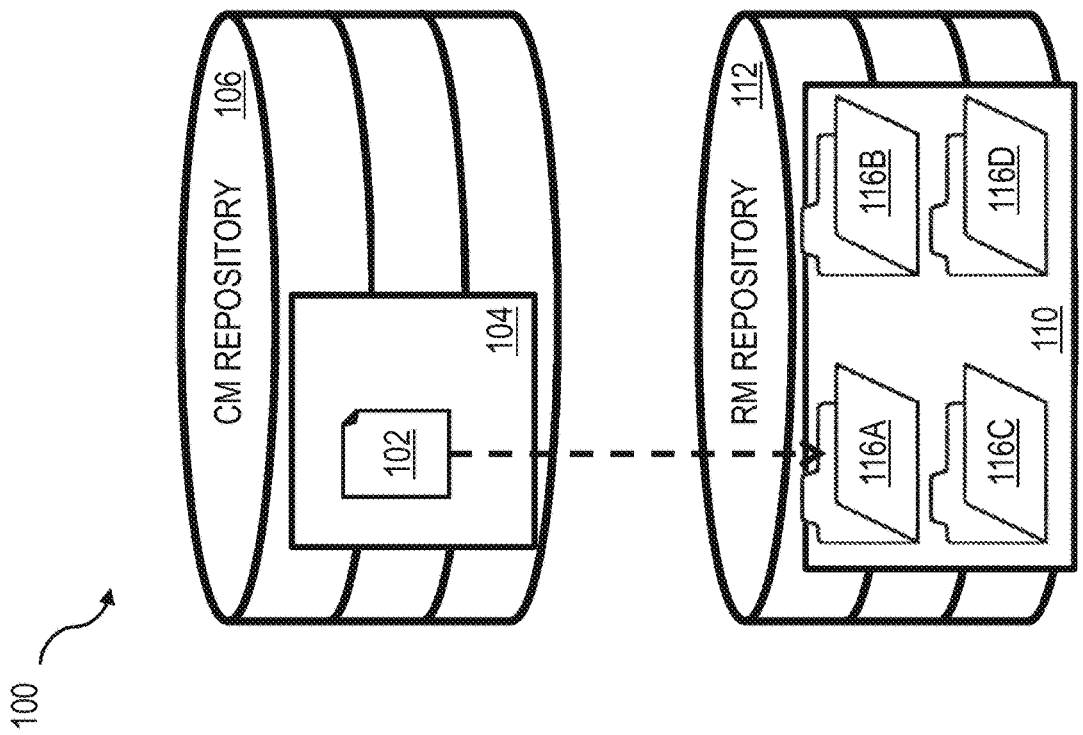
FIG. 1A shows a first view of a computing architecture including data structures and other components that can be included in one or more implementations of the current subject matter.

Document handling as used herein refers to features relating to designation of a document as a record and enforcing records controls for records management. FIG. 1A and FIG. 1B show diagrams of a computing architecture 100 illustrating an example of document handling. Consistent with implementations of the current subject matter, and unlike previously available approaches, document handling can include moving a document 102 from a first file structure 104 (e.g. a document library, a file plan, a hierarchical directory, or the like) in a content management repository 106 to a second file structure 110 (e.g. a file plan) in a records management repository 112 when the document 102 is designated as a record 102A. In this example, moving of the document 102 upon its designation as the record 102A can include creating a duplicate of a content object containing the content of the document 102, and optionally any metadata associated with the document 102 in the second file structure 110 at the records management repository 112. The original content object at the content management repository 106 can optionally be deleted, marked for deletion, flagged as inactive or invalid, or the like once a duplicate of the digital file has been created in the second file structure 110 at the records management repository 112. In other words, in some implementations of the current subject matter, the digital file can be moved from a first physical location (e.g. on a hard disk drive, solid state drive, optical drive, or other physical storage medium) associated with the content management repository 106 to a second physical location associated with the records management repository 112.

In FIG. 1A, the document 102 has not yet been designated as a record. Upon the document 102 being designated as a record 102A, the document 102 is moved or otherwise transferred as the record 102A to the second file structure 110 at the records management repository 112, and a record marker 114 is created in the first file structure 104 at the content management repository 106 as shown in FIG. 1B. It will be understood that the content management repository 106 can be a unitary repository (e.g. allowing access to all users of the repository) or a repository supporting one, or more than one, collaboration or "sharing" site. Collaboration sites can be separate document libraries or other first file structures 104 via which access, permission, visibility, or other limitations or restrictions can optionally be associated such that a first subset of users with access to the content management repository 106 can access a first collaboration site (not shown in FIG. 1A or FIG. 1B) within the content management repository 106, and a second subset of (optionally all) users with access to the content management repository 106 can access a second collaboration site (not shown in FIG. 1A or FIG. 1B) within the content management repository 106.

To allow authorized users of the document 102 to continue to have access (subject to the records controls enforced by the records management repository 112) to the record 102A, a record marker 114 can be created at the content management repository 106 and placed in the first file structure 104 such that the record 102A, despite now being located in the second file structure 110 in the records management repository 112, appears to remain at the content management repository 106 at its same original location. For example, the record marker 114 can remain within the first file structure 104 in the content management repository 106 and act as a link to the record 102A. One or more records controls are applied to the record 102A at the records management repository 112, and access provided via the record marker 114 at the content management repository 106 also is subject to these records controls.

A record marker 114 as used herein can refer to one or more of various approaches to maintaining continuity in document access for a user of the content management system 106. In some examples, upon moving of the content object representing the document 102 from the first file structure 104 to the second file structure 110, a secondary association (e.g. a second parent-child dependency) can be created such that a primary association to the record 102A exists in the second file structure (e.g. the file plan of the records management system) 110 and the secondary association exists in the first file structure 104. In effect, the content object that contains the content and metadata of the document 102 as well as any additional metadata appended to the content object after declaration as a record 102A has two parent associations, a primary association to a location in the second file structure 110 and a secondary association to an original location in the first file plan 104. In other examples, the record marker 114 can include a link or other reference to the new location of the content object (e.g. the declared record 102A) in the second file structure 110.

In the example of FIG. 1A and FIG. 1B, application of the records controls can be handled via record folders 116A, 116B, 116C, 116D, which are defined within the second file structure 110. Four record folders are shown in FIG. 1A and FIG. 1B, but it will be understood that this is merely illustrative. Any number of record folders (as well as record sub-folders and the like) is within the scope of the current subject matter. The second file structure 110 can be a file plan as noted above, and can act as a container for records, record folders, record categories and disposition schedules, etc.

FIG. 2A and FIG. 2B show another computing architecture 200 illustrating an alternative, aspect within the scope of the current disclosure. In this aspect, both content management and records management can be performed within a common repository 202 (which can optionally be a group of two or more repositories managed by a common management system). An integrated records management and content management system 204 that includes the common repository 202 can include both of a first file structure 104 and a second filed structure 110 as shown in FIG. 1A and FIG. 1B and described above. The first file structure 104 can support content management functions, such as for example one or more sharing sites (not shown in FIG. A1 or FIG. 2B), and the second file structure 110 can support records management functions consistent with the discussion above relating to a separate content management repository 106 and records management repository 112. However, in the example of FIG. 2A and FIG. 2B, the common repository 202 can contain both of the first file structure 104 and the second file structure 110.

When the document 102 is designated as a record 102A, the digital file containing the content of the document 102, and optionally any metadata associated with the document 102, are moved from the first file structure 104 to the second file structure 110. In this example, the moving of the digital file from the first file structure 104 to the second file structure 110 need not include copying or moving of the digital file to different parts of a storage medium that stores or maintains content of the common repository 202. Rather, the digital file can remain stored in a same physical location (e.g. on a hard disk drive, solid state drive, optical drive, or other physical storage medium) while its file structure assignment is changed from the first file structure 104 to the second file structure 110.

In FIG. 2A, the document 102 has not yet been designated as the record 102A. Upon the document 102 being designated as the record 102A, the document 102 is moved or otherwise transferred as the record 102A to the second file structure 110 of the records management system, and a record marker 114 is created in the first file structure 104 of the content management system (or collaboration or sharing site) as shown in FIG. 2B. As discussed above in reference to FIG. 1A and FIG. 1B, the first file structure of the content management system can be a unitary repository (e.g. allowing access to all users of the repository) or a repository supporting more than one collaboration or sharing site. Collaboration sites can be separate document libraries or other first file structures 104 with which access, permission, visibility, or other limitations or restrictions can optionally be associated such that a first subset of users with access to the content management system can access a first collaboration site within the first file structure 104, and a second subset of (optionally all) users with access to the content management system can access a second collaboration site, which can be within the first file structure 104 or, alternatively, in a different first file structure (not shown). The record marker 114 can be implemented consistent with one of the examples discussed in reference to FIG. 1B or some functional equivalent thereof.

Figure 3:
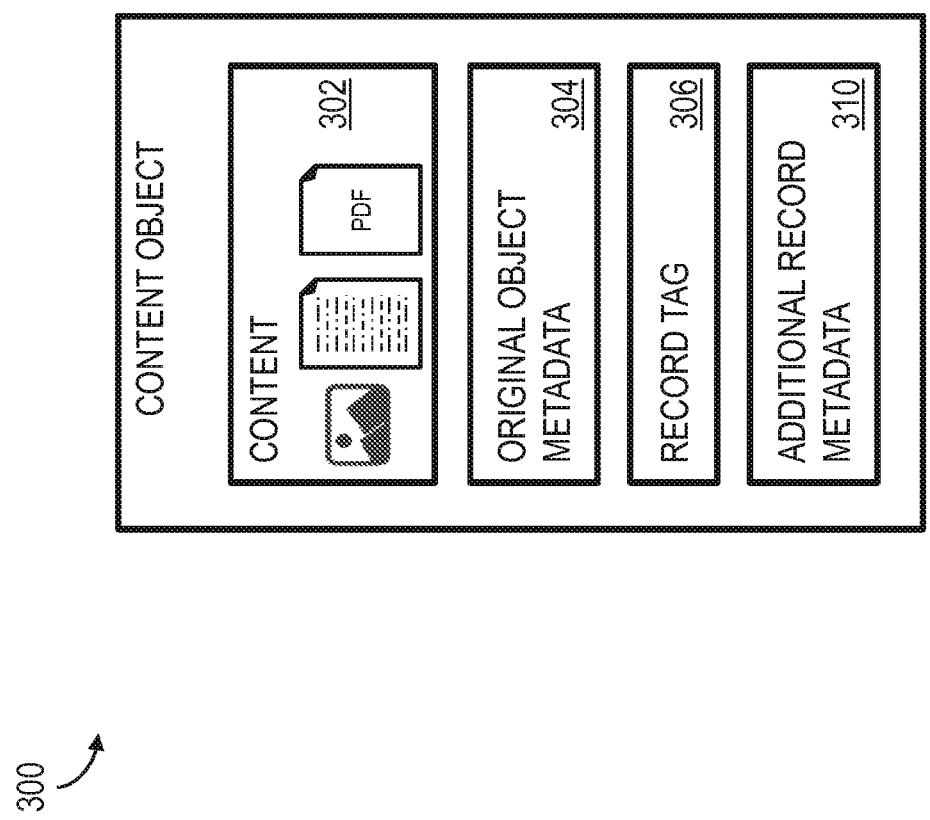
FIG. 3 shows a diagram illustrating features of a content object consistent with implementations of the current subject matter.

FIG. 3 shows a diagram illustrating features of a content object 300 consistent with implementations of the current subject matter. As noted above, a content object 300 can include a digital file or other comparable container that includes content and/or metadata. A typical lifecycle for a content object 300 can include originating as a document 102 (e.g. stored in a first file structure 104 of a content management system), optionally undergoing one or more modifications initiated by one or more users of the content management system, and eventual designation as a record 102A. Origination of a document 102 can include creation of a new document, copying of an existing document or importing of an existing document from another system into a first file structure 104 of a content management repository. As shown in FIG. 3, a content object 300 can include content 302, which can include text, images, photos, Web pages, records, XML documents, other unstructured or semi-structured files, or the like. The content object can also include metadata 304, which can also be referred to as original object metadata to denote that this metadata 304 is associated with the content 302 while the content object 300 is treated as a document 102 in a content management system environment. Upon designation of the document 102 as a record 102A, a record tag 306 can be added to the content object 400. Optionally, additional record metadata 310 can also be added to the content object 400. The optional additional record data metadata, in some implementations, can indicate a type of content (e.g. PDF, scanned document, digital photo, "custom", etc.) in the content object, one or more aspects to be assigned to the record, or the like. Aspects can allow a user, a group of users, an organization, etc. to define custom metadata tags to be associated with the content object 300. These aspects can be used for searching, filing, etc., and can in some implementations of the current subject matter be referenced in dynamic file plan creation and/or rules-based filing of records into a file plan or other second file structure 110.

A records management file plan structure (e.g. an example of a second file structure 110 as discussed above in reference to FIG. 1A, FIG. 1B, FIG. 2A, and FIG. 2B) enables classification and grouping of records with similar characteristics. For example, a file plan can include one or more record categories, which can in turn contain retention and disposition schedules for record folders and records assigned to the record category (either directly, or by assignment to a record folder within a record category). Disposition information, which can include a disposition schedule, can define or otherwise determine how long the content or a record is to be retained in a records management system and what should happen to the content object 300 both after it becomes a record and after it should no longer be retained.

Figure 4:
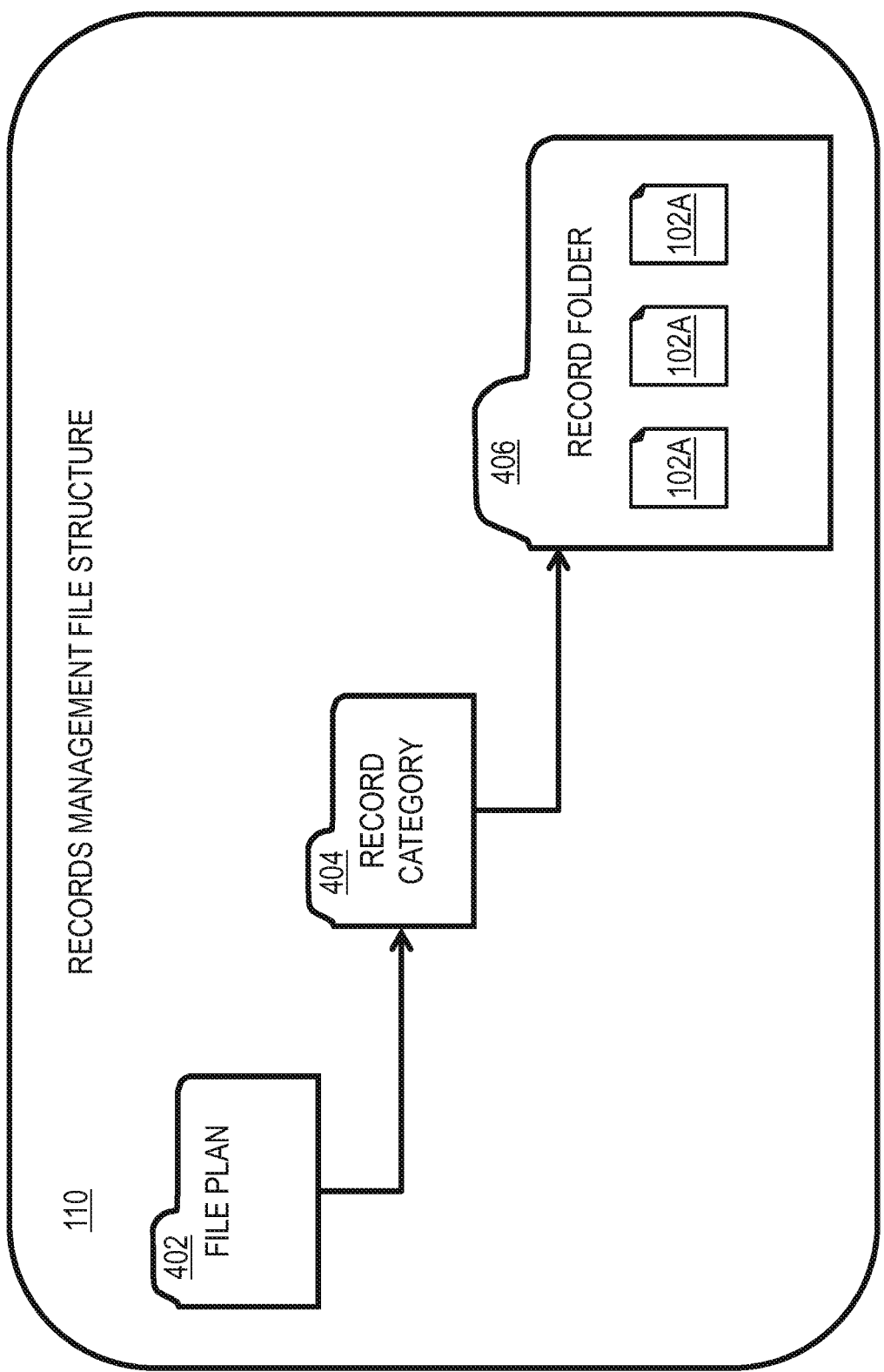
FIG. 4 shows a diagram illustrating features of a file plan consistent with implementations of the current subject matter.

FIG. 4 shows a diagram illustrating the relationship of various components of a records management file structure 110 that can be used in association with a records management approach consistent with various implementations of the current subject matter. A file plan 402 can include one or more record categories 404 (also referred to herein simply as categories). A record category 404 can be used to control how records are managed, and how records are disposed of when they are no longer needed. This control can optionally be defined using a disposition plan or a disposition schedule. A record category 404 can also include other record categories, for example record sub-categories or the like. A record folder 406 can be created in a record category 404, and can thereby inherit the attributes of the record category 404 and be considered to be under the control of the record category 404. Once the record folder 406 is created, security restrictions defined for the record folder 406 can apply to any records 102A within the record folder 406. A record folder 406 can be open or closed. A closed record folder cannot accept records for filing, while an open record folder can. As noted above, a record 102A is a content object 300 (which can be any of a number of content items as discussed elsewhere herein), which is referred to as a document 102 when it is under the control of a content management system (e.g. before designation as a record 102A). A record 102A filed in a record folder 406 is under the control of any record category 404 and/or record sub-categories to which the record folder 406 belongs.

Figure 5:
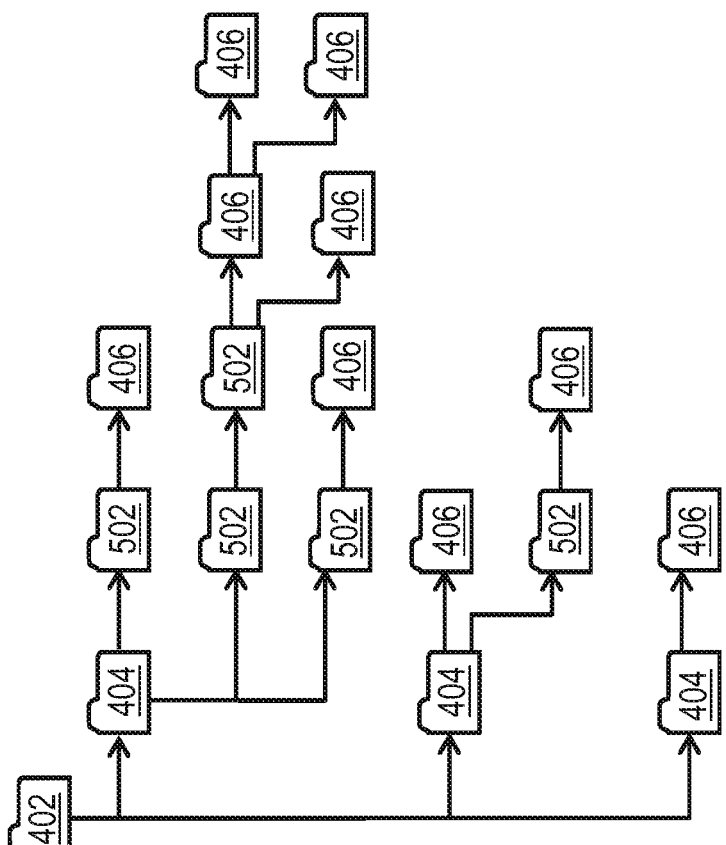
FIG. 5 shows a diagram illustrating features of an arbitrarily complex file plan consistent with implementations of the current subject matter.

A records management repository 112 can include one, or optionally more than one, second file structure 110 (e.g. one or more file plans 402). As noted above, the second file structure 110 can be a file plan that is based on a file plan definition, which can optionally include XML (extensible markup language) or some other language (which can be a markup language or some other language). A loader program (or a module or other software functionality) can load the file plan definition to configure the one or more servers upon which the content management repository and records management repository functionality described herein is implemented. A file plan of a second file structure 110 can include one or many record categories 404 and/or record category series. For example, a file plan 402 consistent with implementations of the current subject matter can be arbitrarily complex, for example to meet the needs of an organization, sub-organization, or the like and/or to comply with one or more records management standards (e.g. the U.S. Department of Defense 5015.2 standard). FIG. 5 shows an example of an arbitrarily complex records management file structure 110 in which a file plan 402 includes multiple records categories 404, some with sub-categories 502, and a variety of records folders 406 within the various categories 404 and subcategories 502. As shown in FIG. 5, a category 404 or subcategory 502 can include either or both of sub-categories 502 and records folders 406. Record folders 406 can also include other record folders 406.

The approaches illustrated in FIG. 1A and FIG. 1B and FIG. 2A and FIG. 2B can support both standalone system installations and the use of multiple servers (either collocated or distributed among multiple locations) to provide integrated content and records management solutions that can be wholly on-premises installations, wholly cloud-based installations, or hybrid installations in which on-premises and cloud-based installations interact to provide content management and records management functionality.

The architecture example shown in FIG. 1A and FIG. 1B can optionally include a single server machine (which can optionally include multiple processors) or multiple server machines upon which the content management repository 104 is implemented and one or more server machines upon which the records management repository 112 is implemented. In the architecture example shown in FIG. 2A and FIG. 2B the common repository 202 can be implemented on one or more than one server machine.

Figure 6:
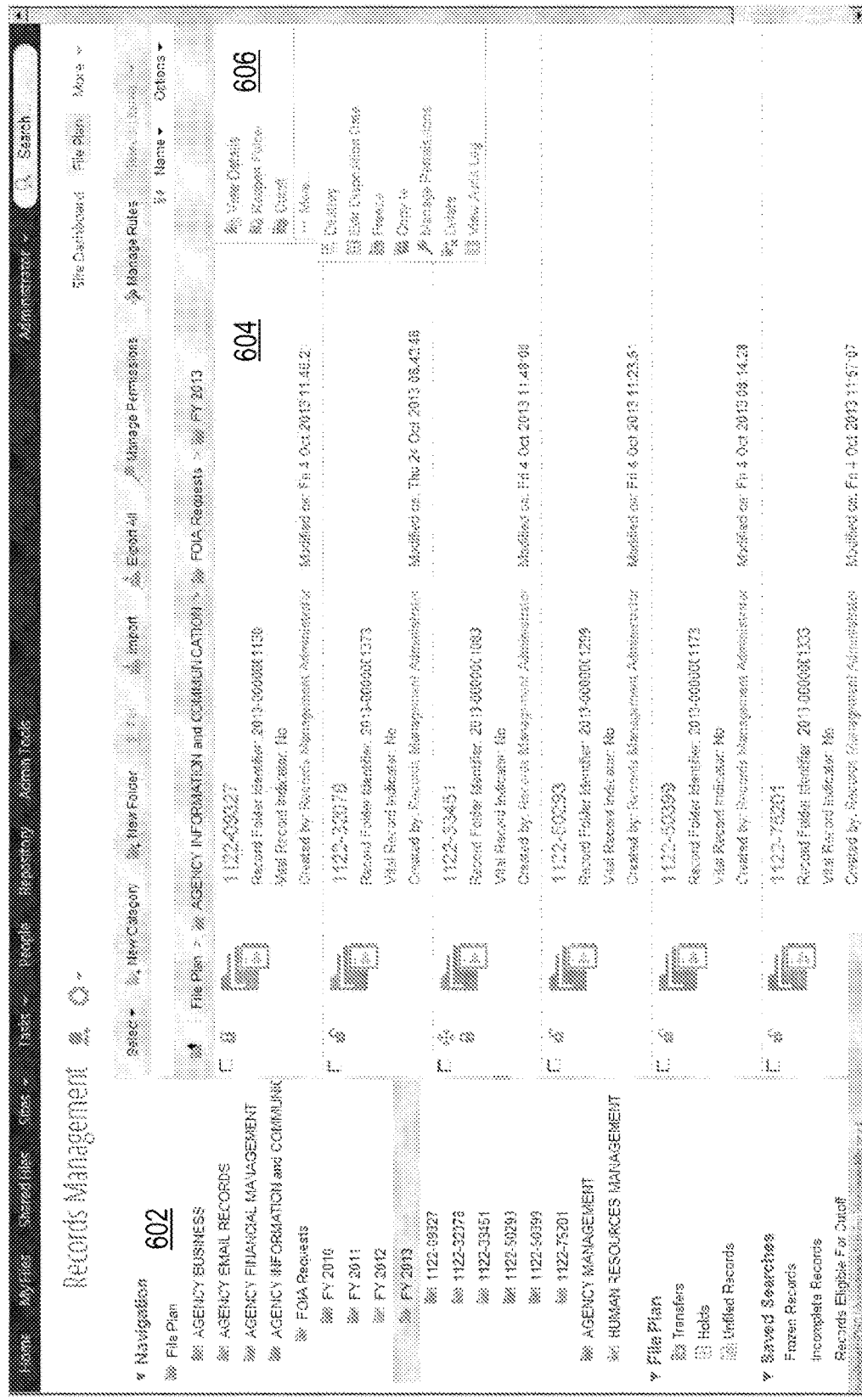
FIG. 6 shows a screenshot illustrating features of a records management file plan user interface screen consistent with implementations of the current subject matter.

FIG. 6 shows a screenshot 600 of a file plan user interface screen. The user interface can include various sections (e.g. panes, frames, etc.) that provide different functionality and display different information. In the screenshot 600 of FIG. 6, a navigation section 602 can include a directory structure with a file plan at a root of the directory structure and categories and folders subordinate to the file plan. When part of the directory structure is selected, a detail section 604 can display details about the contents of the selected file plan, category, folder, etc. In the screenshot 600, the detail section 604 shows information about a record folder for FY2013. This folder further includes several additional case folders that include records relating to specific cases. As is discussed in more detail below, an action console 606 is displayed with a selected folder in the detail section 604. The detail console can include options including viewing details about the selected folder, reopening a closed folder (or optionally closing an open folder), cutting off the folder (e.g. so that records in the folder can no longer be edited), destroying the folder and its contents, editing a disposition date or schedule of the folder, freezing (or optionally unfreezing) the folder and its contents, copying the folder and/or its contents to another location, managing folder permissions, deleting the folder, viewing an audit log for the folder, etc. It will be understood that similar actions can be performed at any level of the file plan, including categories, sub-categories, folders, sub-folders, and individual records.

Figure 7:
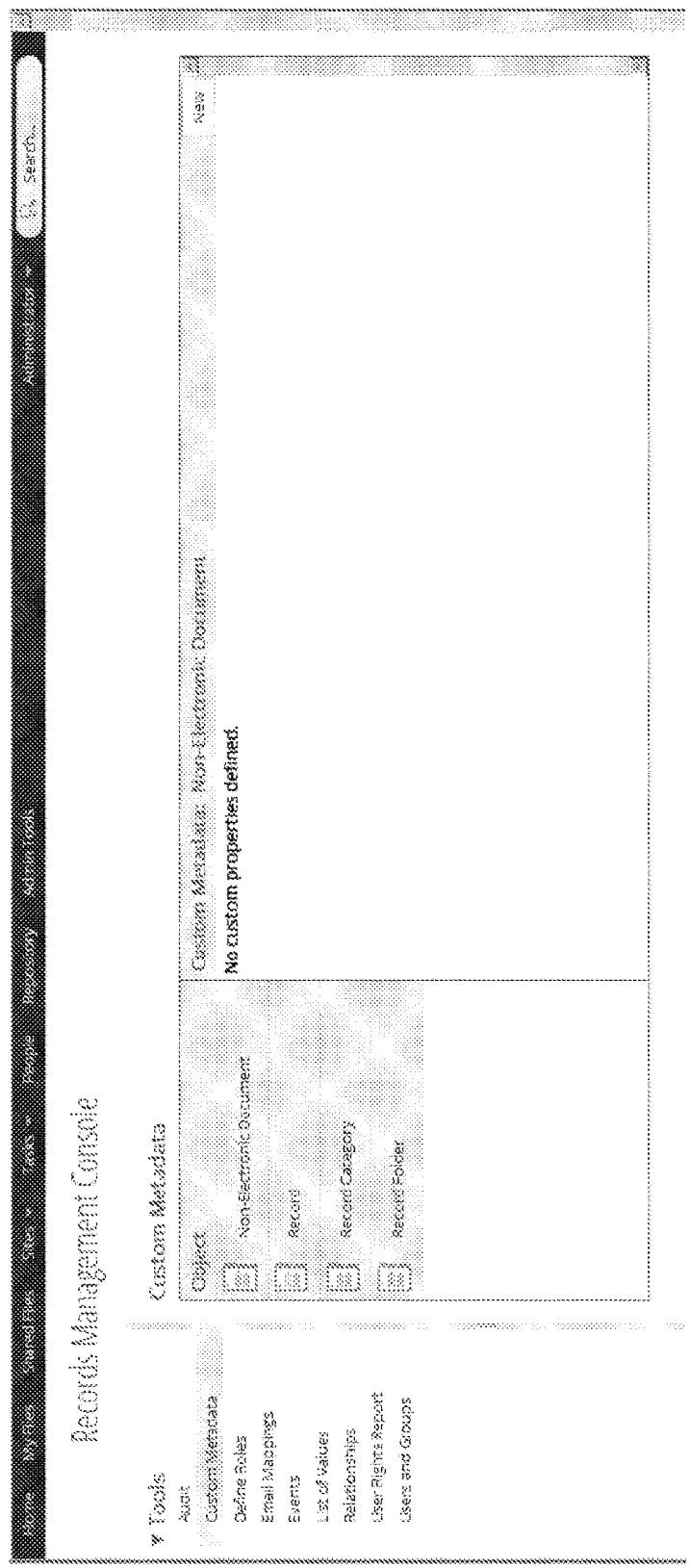
FIG. 7 shows a screenshot illustrating features of a records management console consistent with implementations of the current subject matter.
Figure 8:
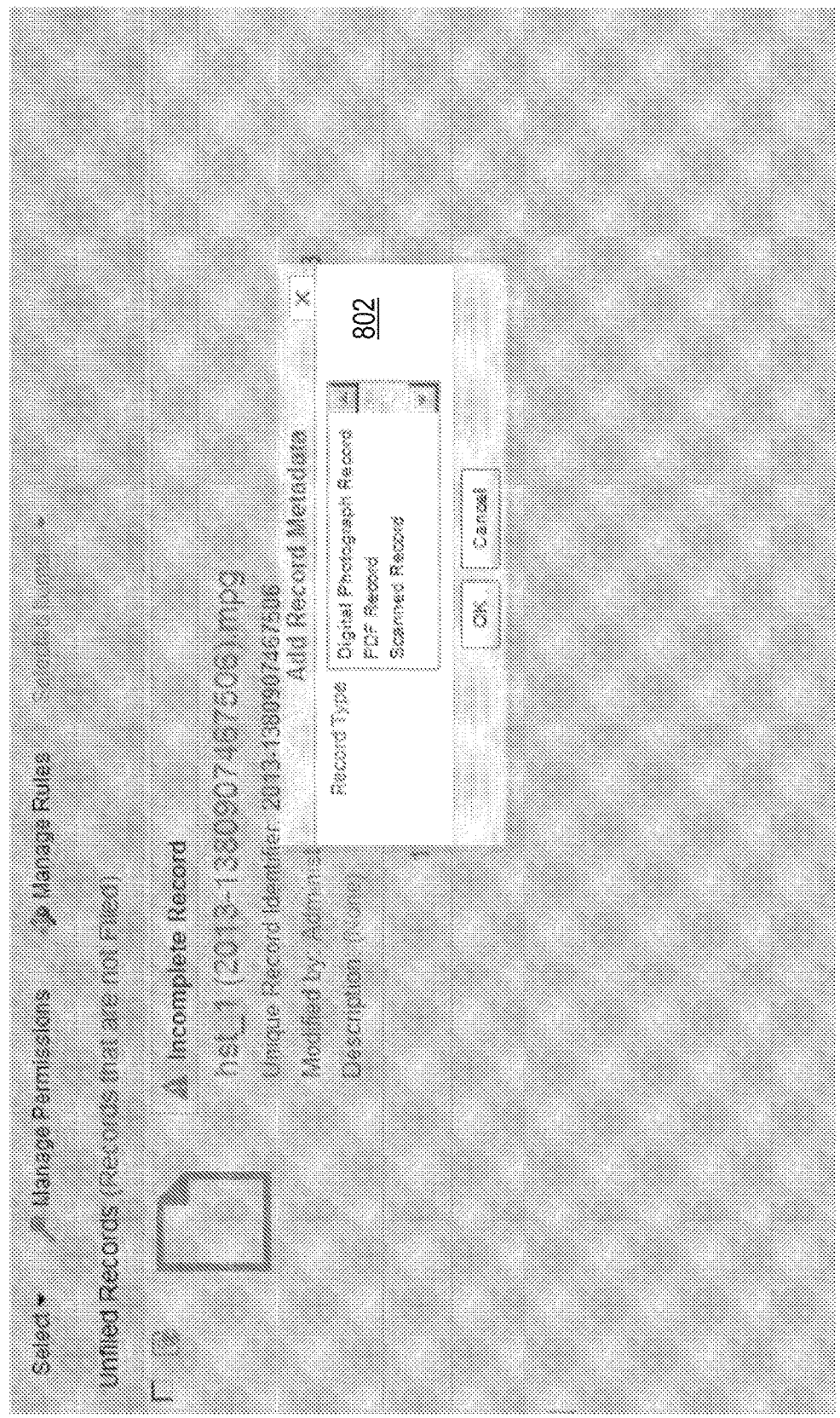
FIG. 8 shows a screenshot illustrating features of a end user interface consistent with implementations of the current subject matter.

As discussed above in reference to FIG. 3, a content object 300 is appended with a record tag 306 and can optionally be further appended with additional record metadata 310. FIG. 7 show a screenshot 700 illustrating a records management console user interface in which options for such additional record metadata can be created, modified, and otherwise managed. FIG. 8 shows a screenshot 800 of an end user interface illustrating how a user can be queried for additional record metadata upon designating a document as a record. In some implementations of the current subject matter, a pop-up window 802 or other input prompt can be displayed to request that the user indicate a record type and/or other aspects or metadata information to be added to the content object 300 that is now designated as a record. As discussed in more detail below, some implementations of the current subject matter can also or alternatively include automated or dynamic addition of record metadata, for example based on a context of the document 102 that is designated as the record 102A, the actual content 302 of the document 102, original document metadata 304, or the like.

Figure 9:
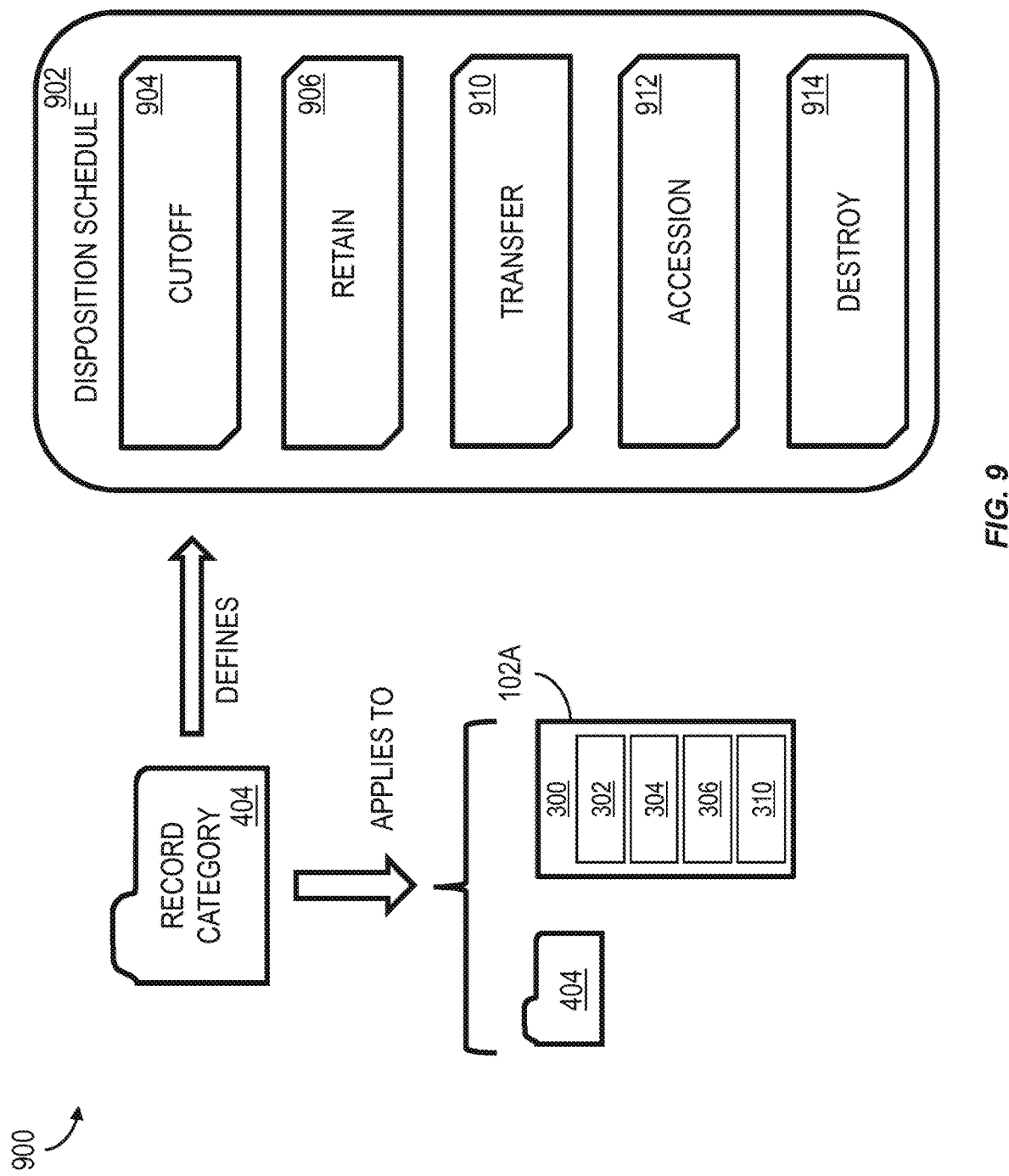
FIG. 9 shows a diagram illustrating features of a disposition schedule as defined by a record category consistent with implementations of the current subject matter.

FIG. 9 shows a diagram 900 illustrating a graphical representation of a disposition schedule and how it can be applied per a record category 404. As noted above, properties of a record category 404, including a disposition schedule defined for the record category 404, propagate to all record folders 406 and records 102A within the record category 404. A disposition schedule 902 defined for the record category 404 can include definitions of disposition criteria used to assign a record 102A or record folder 406 (or optionally a sub-category within the record category 404) to a specific state. The disposition criteria can include timing criteria (e.g. dates, times, durations, etc.) as well as event criteria (e.g. relating to actions performed on the records, to changes in context) that can be defined by rules or triggers. Examples of record disposition states include cutoff 904 (e.g. no more editing allowed), retain (e.g. how long a document should be retained before it is disposed of), transfer (e.g. moving of a record to another records management system), accession (e.g. moving of a record to an archival site), and destroy (e.g. destroying of a record after its retention period ends).

Figure 10:
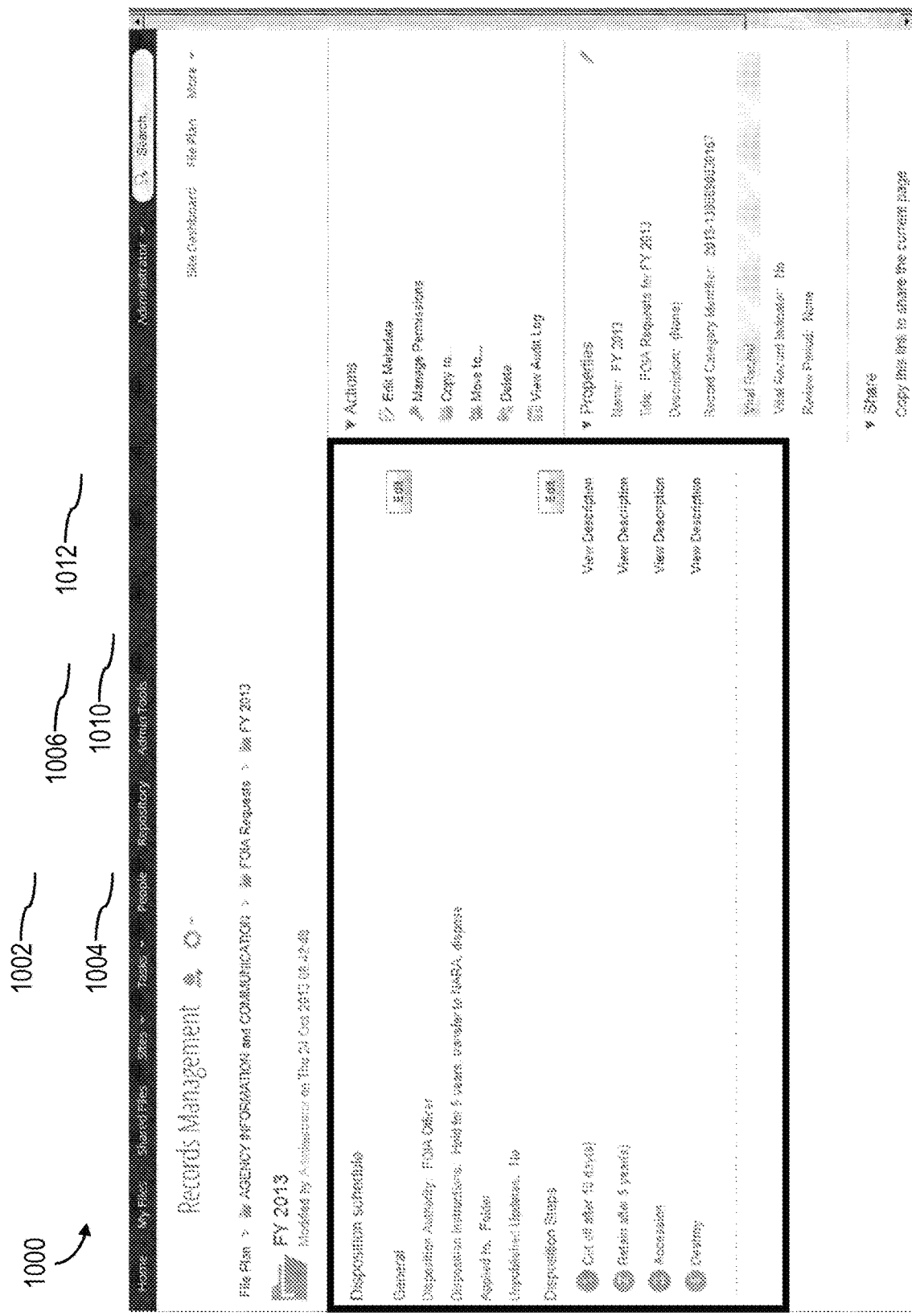
FIG. 10 shows a screenshot illustrating features of a user interface for defining and modifying disposition schedules consistent with implementations of the current subject matter.
Figure 11:
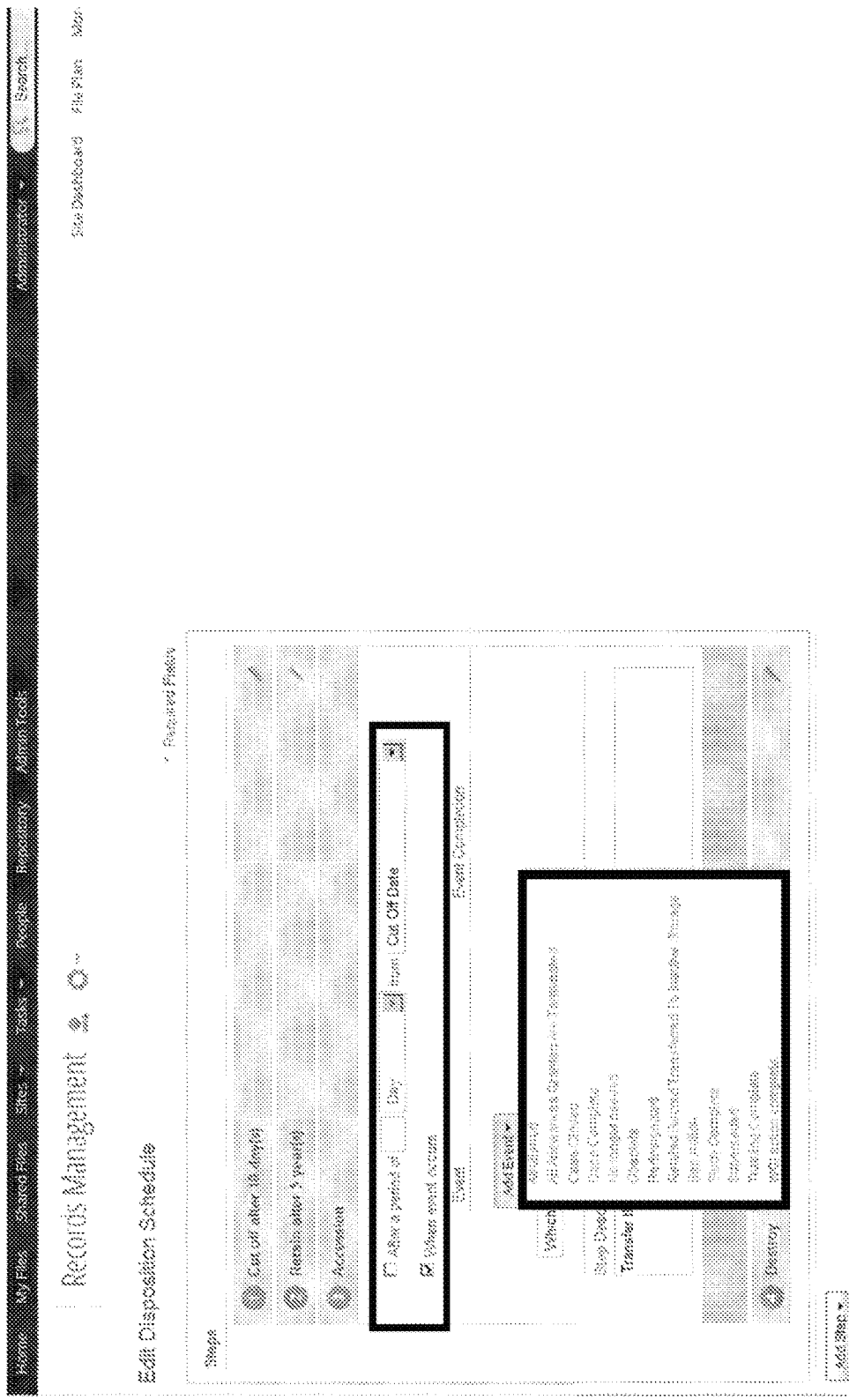
FIG. 11 shows another screenshot illustrating features of a user interface for defining and modifying disposition schedules consistent with implementations of the current subject matter.

FIG. 10 shows a screenshot 1000 illustrating features of an example user interface for viewing a disposition schedule, for example by setting values for cutoff times (e.g. 10 days after record designation), retention (e.g. 5 years), accession, transfer, destruction, etc. FIG. 11 shows another screenshot 1100 illustrating features of an example user interface for defining a disposition schedule, which can include options for defining data and/or event triggers for state transitions for records. Events can include options including (but not limited to) closing of case, completing a case, a record becoming obsolete, redesignation, abolishment of a record or its underlying content, termination of allowances, separation, transfer of related records, superseding of a record, etc. User definition of custom events (e.g. events not predefined by a records management system vendor can also be supported.

Consistent with implementations of the current subject matter, record security can be configurable at any level of desired granularity. For example, access permissions (e.g. read, write, etc.) can be configured per user, per role, etc., and can be defined at a record level, a record folder level, a record category level, and/or a file plan level. These access permissions can control the types of actions a particular user can take. In some examples, a mapping can exist (e.g. based on roles, permissions held by users in a content management system from which a document is declared as a record, or the like) between users or groups of users and access rights to a record in a records management system.

Implementations of the current subject matter can also support various audit security features, such as for example an ability to create an edit history for a record 102A, a record folder 406, a record category 404, and/or an entire file plan 402. An audit report generated in this manner can optionally be saved as a record consistent with other features of a content object as discussed herein.

As noted above, implementations of the current subject matter can provide advantages relating to facilitating full participation among users at an organization in the processes of records management. User adoption is critical to the success of records management and governance programs. Implementations of the current subject matter can allow users to declare records "in-place" without the need to move a document to another site or remove it from content workflows. Further advantages, possibly including but not limited to isolation of content users from the records management structure and processes, isolation of records managers from the document authoring environment while still providing full control over the records management structure and processes, and seamless integration of records management actions and processes with the content management ecosystem, can also be realized in association with various implementations of the current subject matter.

Figure 12:
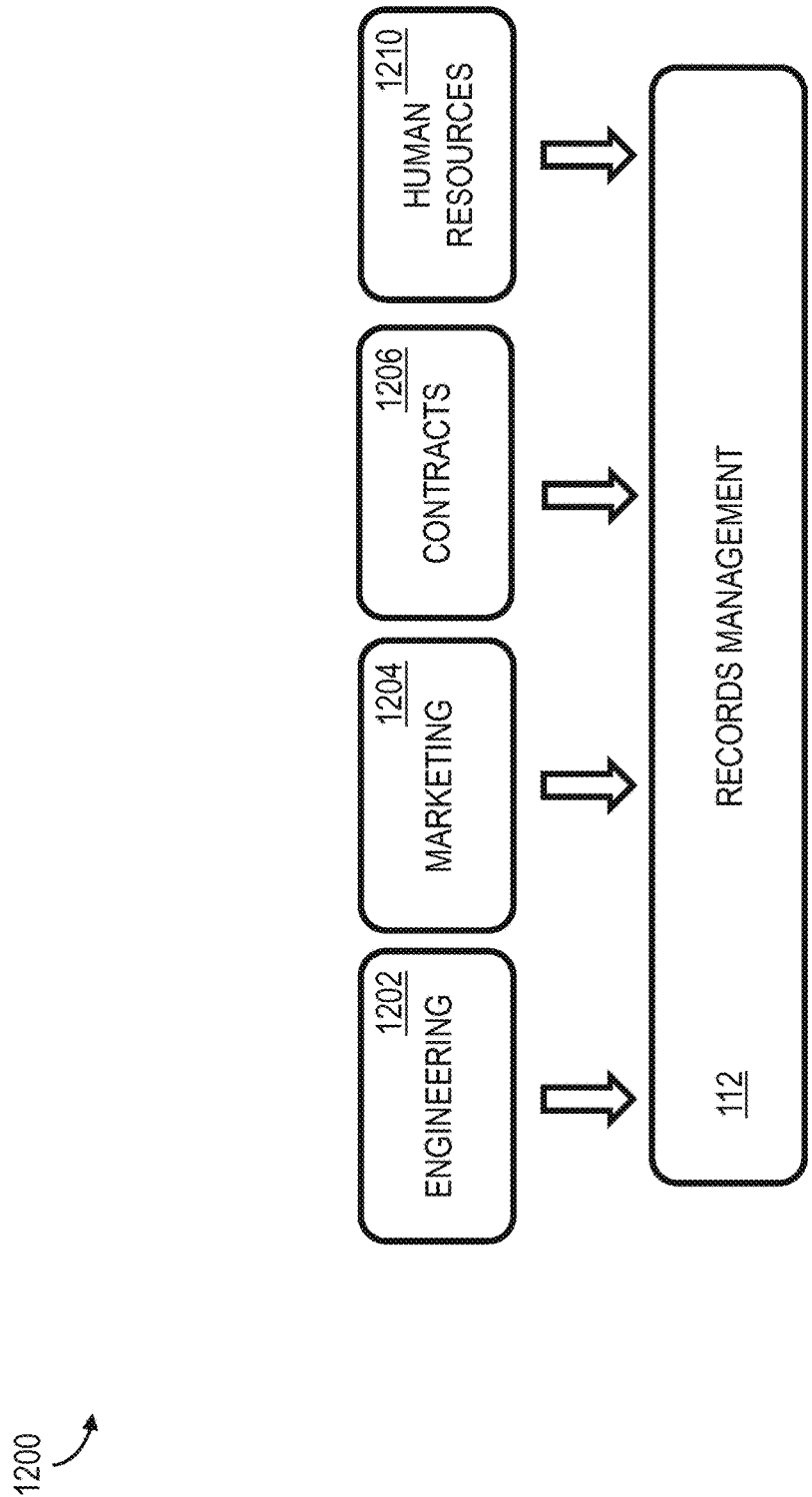
FIG. 12 shows a diagram illustrating an example of the interplay between sharing sites and a records management site.

FIG. 12 shows a diagram 1200 illustrating an example of a content management environment. A central records management repository 112 (which can optionally be a designated part of a common repository 202 as discussed in relation to FIG. 2A and FIG. 2B above) can serve as a common "site" for handling records management for all content of an organization, including content that is generated, modified, accessed, etc. by users who are internal and optionally also external to the organization. These users can interact with documents 102 via one or more content management system sites, which can also be referred to as collaboration or sharing sites. In the example of FIG. 12, separate sharing sites 1202, 1204, 1206, 1210 can exist to handle documents respectively relating to engineering, marketing, contracts, and human resources. Each sharing site can include its own content management rules, workflows, access permissions, and the like, which can be configured to facilitate the business activities supported by the specific sharing site. However, declaration of a document from any of these sharing sites 1202, 1204, 1206, 1210 as a record results in the content object 300 of the document being moved to the records management site 112 while a record marker 114 is created at the appropriate sharing site such that a user with access to the document via the sharing site can continue to have access to the record subject to any controls that are enforced by the records management site 112. In this manner, a user need not know or understand anything about a directory structure of the records management site 112.

Filing and management of records can take place under the supervision of a records management team "behind the scenes" from the perspective of the user. This result can be achieved because of the creation of the record marker 114 automatically after a record is declared and the placement of the record marker 114 into the same directory location in the first file structure 104 of the content management system repository 106, or optionally within one of a plurality of sharing sites 1202, 1204, 1206, 1210 within a content management system environment. When a record is moved within the records management site 112, the record marker 114 at the content management system repository or sharing site is dynamically updated such that user interaction with the record marker 114 continues to allow access to the record 102A as long as the record remains available for such interaction subject to the disposition schedule and access permissions controlled by the records management site 112. Consistent with some implementations of the current subject matter, an arrangement similar to that shown in FIG. 12 can be configured when a sharing site is enabled for record management features. For example, upon creation of a sharing site (or alternatively after such creation), a sharing site administrator can access one or more configuration user interface screens that provide options relating to enablement of records management features for the sharing site. The administrator can choose to hide or not hide a document from the sharing site once the document has been declared as a record and can also configure settings defining criteria that govern when and whether a user of the sharing site has permissions to declare a document as a record. For example, an administrator may be able to choose between allowing users to declare a document as a record at any time, after a major revision (criteria for defining what constitutes a major revision can also be set), once the document is published, etc. Users can be given record declaration privileges based on various criteria such as roles within an organization, specific user identities, etc.

In some examples, enabling of records management capabilities for a sharing site can cause a notification to be sent to a records management team such that the records management team can review whether the sharing site should be linked to the records management system. Users of a sharing site linked to a records management system are generally not given full records management access, but may instead be assigned a restricted access role within the records management system (e.g. records management contributor). This restricted access role can allow a sharing site user to, for example, add new records to the records management file plan, to read records for at least some time assuming the user had such access to the originating document in the sharing site, and/or write or edit access to a record and/or its metadata for some limited period of time (e.g. prior to cutoff).

Enablement of records management features for a sharing site can also be disabled after having been enabled, but generally only by a user with sufficient permissions. Once a sharing site is decoupled from the records management system, records created from documents in the sharing site can optionally no longer be accessed from the sharing site. In other words, the record marker 114 created in the sharing site for a record can be deleted or otherwise de-linked from the corresponding record even though the record remains in the file plan 402 or other second file structure 112 of the records management system.

As noted above, an enabled sharing site can include an additional permission group called record contributors or the like. By default this group can contain all the members of the sharing site, but it can also be configurable to contain a sub-set of roles/groups/users if required. A user must be a member of the record contributors group of a sharing site to be able to make a document a record. A record contributors role can also be added to a file plan 402 or other second file structure 110 of the records management system, and user with this role can have view and create record capabilities such that their permissions include read and file on newly declared records. A records contributor can also have read permissions on the root of the file plan, but may in some examples not be able to see a remainder of the filing hierarchy (e.g. unless additional permissions have been set by the records administrator). When a sharing site user has read permissions on a document that has been declared as a record, the read permissions can be mapped to a comparable records management read permission while other document-centric permissions may be ignored.

Figure 13:
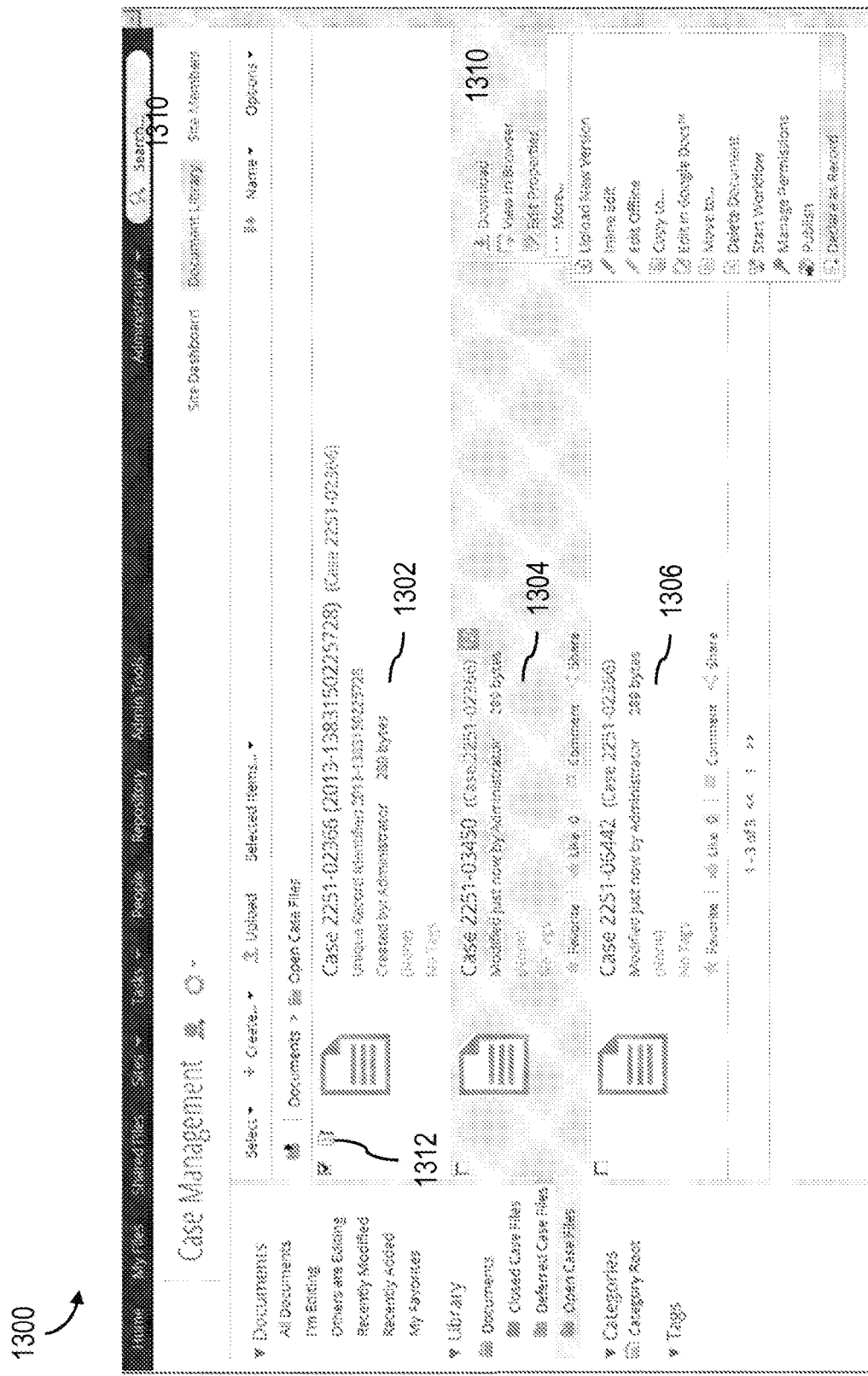
FIG. 13 shows a screenshot illustrating features of a user interface in which content is declared as a record consistent with implementations of the current subject matter.

FIG. 13 shows a screenshot 1300 illustrating features of a user interface screen viewable by a user of a content management system repository or sharing site. Three documents 1302, 1304, 1306 are shown in the detail section of the screen. These three documents are in an "open case file" folder of a first file structure 104 of the content management system repository or sharing site. Through user interaction with an action console 1310, the user can select the action "declare as record," which causes the document 1304 to be declared as a record. Optionally, a confirmation screen or window or the like can be displayed to a user so that the user can verify his or her intention to declare the document as a record.

As noted above, declaration of the document 1304 as a record causes the content object 300 of the document 1304 to be moved to the records management site 112. A record marker 114 is created in the content management system repository or sharing site. A notification can be sent to a records manager when a new record is declared, and the notification can include information such as a link to a current location of the newly declared record (e.g. automatically filed in a file plan, held in an unfiled records folder as discussed below, etc.). A records manager can also be prompted with an option to request more information about the new records from the user, for example in the notification or via interaction with the new record in a records management user interface, or to reject the record. A rejected record can be reverted to its previous state as a document in the sharing site or content management system.

Movement of the content object 300 and creation of the record marker 114 occurs without any significant impact visible by the user at the sharing site and/or content management system. The user interface representation of the document 1304 will change slightly. For example, the document 1302 has been previously designated as a record prior to capturing as the screenshot 1300. Accordingly, the display of the record 1302 includes a "unique record identifier" and the user interface depiction of the document includes an icon 1312 that visually indicates that it is now declared as a record. Additionally, one or more previously available actions that were applicable to the document in the sharing site or content management system can be removed from the user interface. While FIG. 13 shows declaration of a record via a mouse click or touch screen selection of a user interface element, it will be understood that keyboard shortcuts, as well as other types of user inputs (e.g. visual, tactile, auditory, etc.) can be sued to declare a record as well as to perform other interactions with a user interface as discussed herein.

In some implementations of the current subject matter, placement of records into specific file plans, records categories, records folders, or the like can be automated, thereby reducing the need for business users to navigate complex classification structures. In addition, some implementations of the current subject matter provide reduced demands on records managers via features that auto-create file plans based on pre-configured business rules. Such an approach can allow for dynamic folders that can be automatically created, thereby allowing the file plan to adapt with the business over time throughout the content lifecycle.

Figure 14:
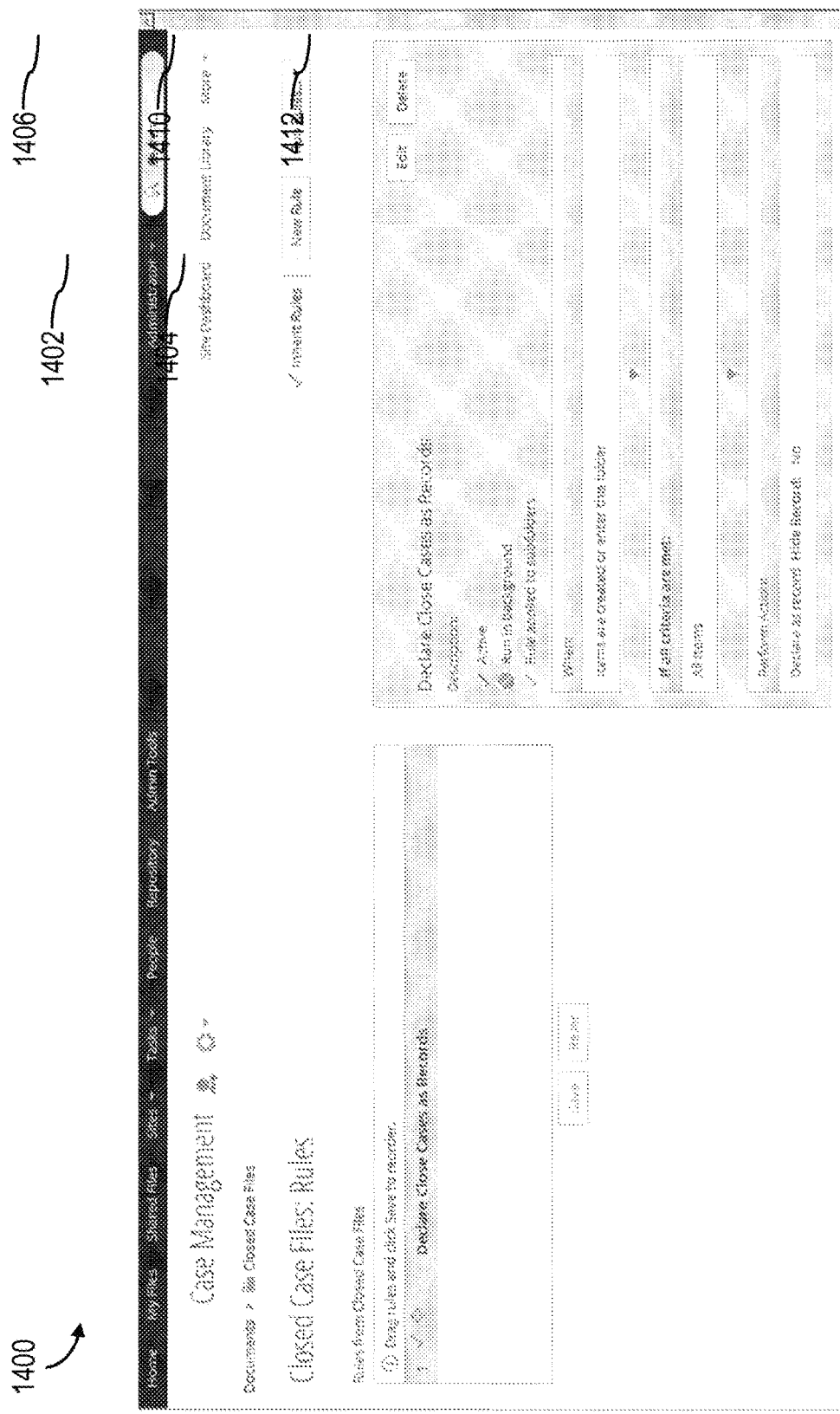
FIG. 14 shows a screenshot illustrating features of a user interface for defining and modifying rules for record declaration consistent with implementations of the current subject matter.

In addition to the approach of manually labeling a document or case file as "closed," thereby causing its automated designation as a record, the current subject matter also includes other functionality that can invoke designation of one or more documents, or optionally all documents in a folder in a first file structure 104 (e.g. a file structure associated with a content management system 104 or sharing site), as a record. For example, consistent with some implementations of the current subject matter, declaration of a record can be an automated process that occurs according to one or more criteria. For example, FIG. 14 shows a screenshot 1400 illustrating user interface features relating to rules for declaring documents as records. In this example, a rule can be established that when a case is designated as closed (e.g. when a folder containing documents relating to the case is moved from an open case folder to a closed case folder in the first file structure 104, when a user designates the case as closed, etc.), the documents relating to the case are automatically declared as records. In the non-limiting example of FIG. 14, the rule is established for a "closed case files" folder in the first file structure 104 such that when any content is moved to the close case files folder, that content is designated as a record.

Figure 15A:
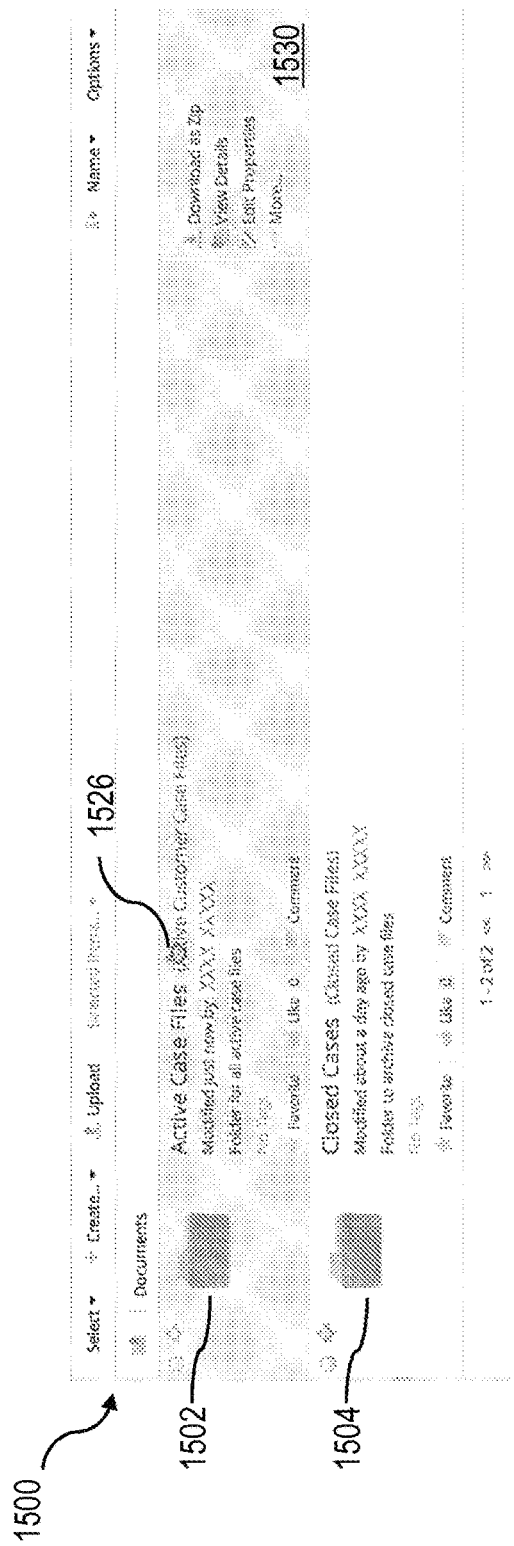
FIG. 15A, FIG. 15B, FIG. 16A, FIG. 16B, FIG. 17A, and FIG. 17B show a series of shows a screenshots illustrating an example of declaration of a record via user interaction with a user interface consistent with implementations of the current subject matter.
Figure 15B:
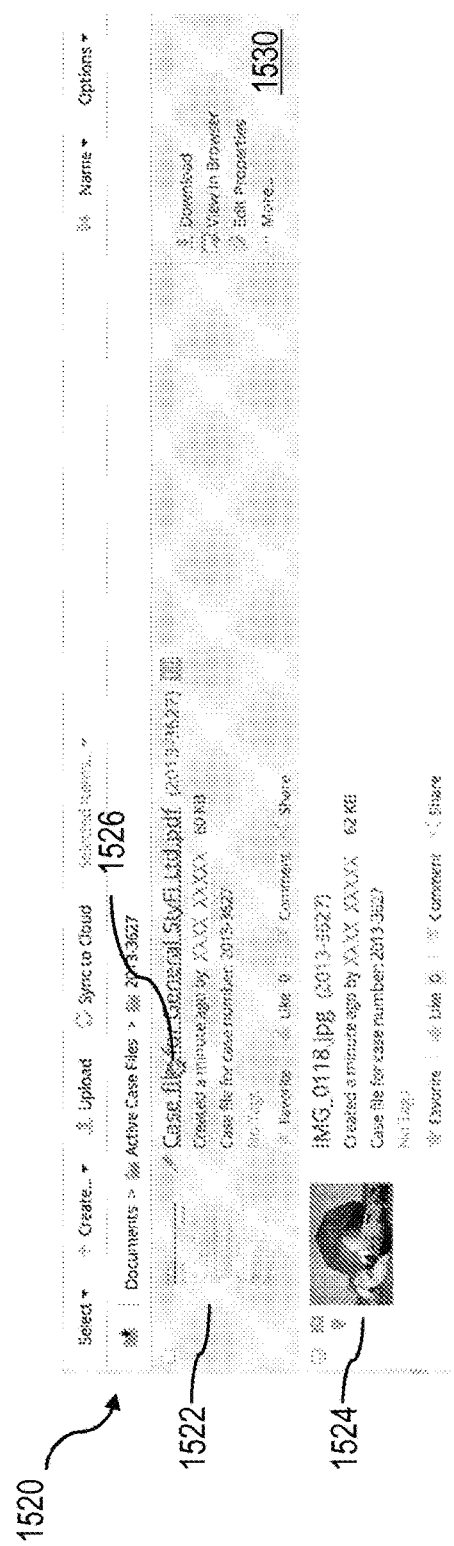

Automated declaration of records can be implemented via other approaches as well. For example, a user or owner of a content object that is involved in a workflow or other business process (referred to generically herein as a workflow), for example a workflow having one or more actions, processes steps, sub-processes, or the like through which a user is guided within a content management system, can perform an action, or an event can occur, during the workflow that automatically results in the content object being designated as a record. As an example of this feature, a workflow can include handling of a case, such as for example an insurance claim. FIG. 15A, FIG. 15B, FIG. 16A, and FIG. 16B show example screenshots 1500, 1520, 1600, 1620 of user interface screens with which a user can interact in the course of completing actions associated with the workflow. FIG. 15A shows a first screenshot 1500 in a first folder 1502 containing "active customer case files" and a second folder 1504 continuing "closed case files" shown as active use interface elements. Selection of the first folder 1502 can directly or indirectly result in display of a second screenshot view 1520 shown in FIG. 15B. For example, if only one active case file is included in the first folder 1502, the screenshot 1520 of FIG. 15B can be displayed directly. Individual active case files can also exist within the first folder 1502 such that an intervening screen can allow a user to select a specific active case file within which to work. The screenshot 1520 of FIG. 15B shows an example of contents of such an active case file. In this example, the active case file includes a PDF file 1522 containing documents relevant to the specific active case file. Also included is an image 1524 associated with the case file. For example, if the active case file is for an insurance claim, the image 1524 can document a loss or other damage to which the claim relates.

Figure 16A:
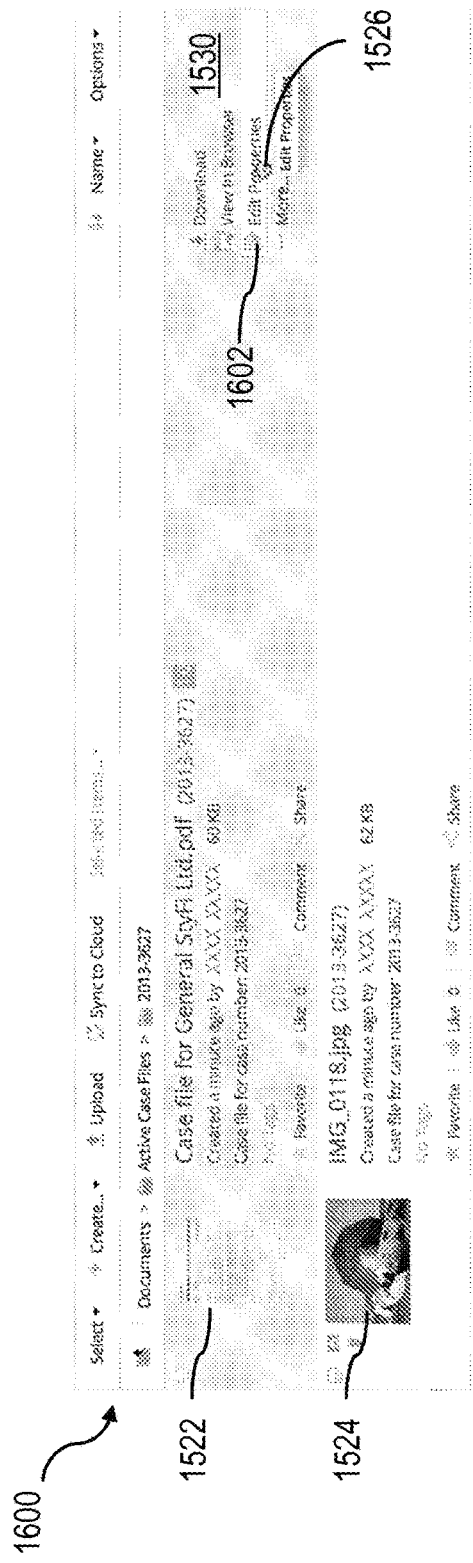

In both of the screenshots 1500 and 1520 of FIG. 15A and FIG. 15B and also in the screenshot 1600 of FIG. 16A, a currently "active" user interface element (e.g. one over which the cursor 1526 is hovering) can have displayed with it an action console 1530. In FIG. 16A, a "edit properties" tool 1602 is selected by the cursor 1526. This selection can cause display of an edit properties screen, which is shown in the screenshot 1620 of FIG. 16B. Within this edit properties screen, a user can edit information about or other properties of the content object, such as for example a case number, a name, a title, a description, or one or more tags or other metadata to be associated with the case.

Figure 16B:
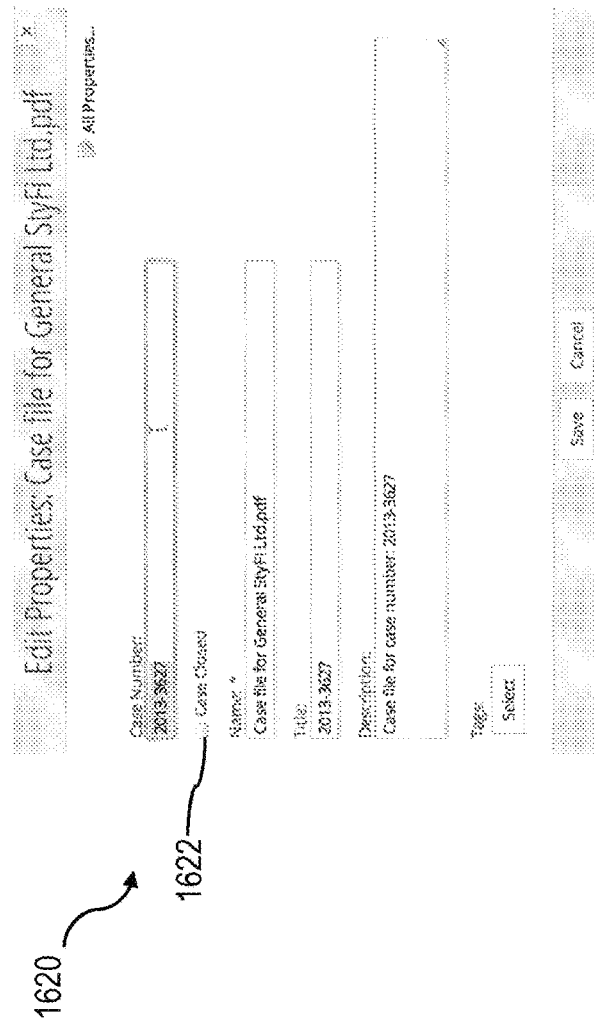
Figure 17A:
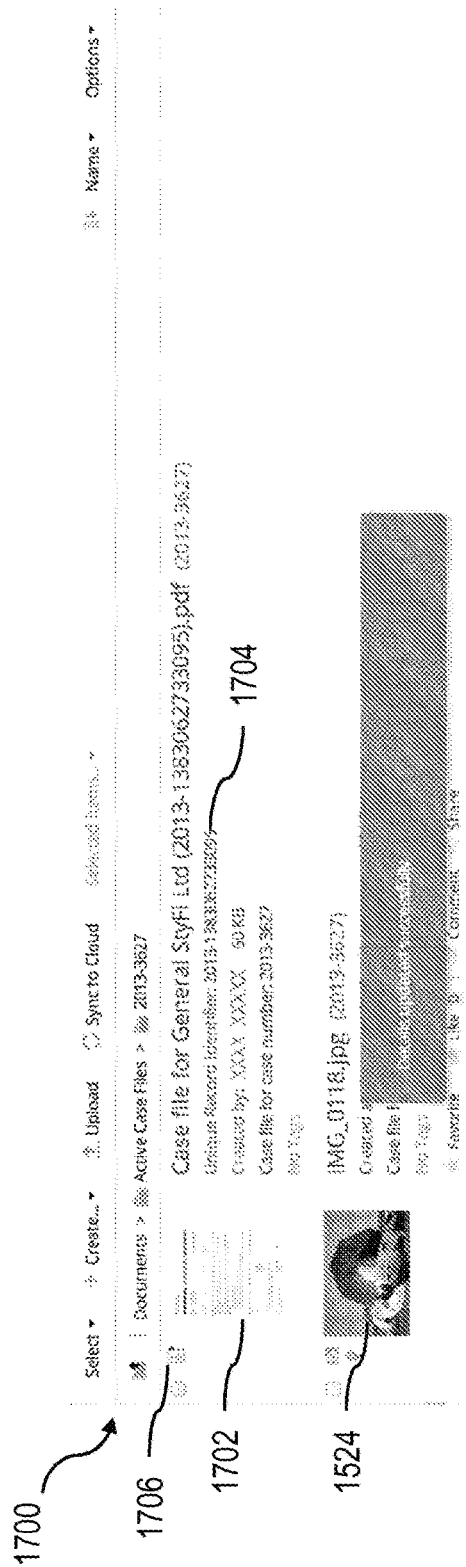
Figure 17B:

In addition, the edit properties screen can include a "case closed" user interface element 1622. Activation of this element 1622 and saving of the changes to the properties (e.g. via a "save" button as shown in FIG. 16B or some other approach) returns the view to the screenshot 1700 of FIG. 17A, in which the case file 1522 shown in FIG. 15B remains, but is now designated as a record 1702 with a unique record identifier 1704 and a record indicator icon 1706. The screenshot 1720 of FIG. 17B shows a change to the action console 1530 to reflect actions that a user can take with respect to a declared record. In this example the options include downloading the record, editing the record metadata, and hiding the record. Other options are within the scope of the current subject matter.

Figure 18:
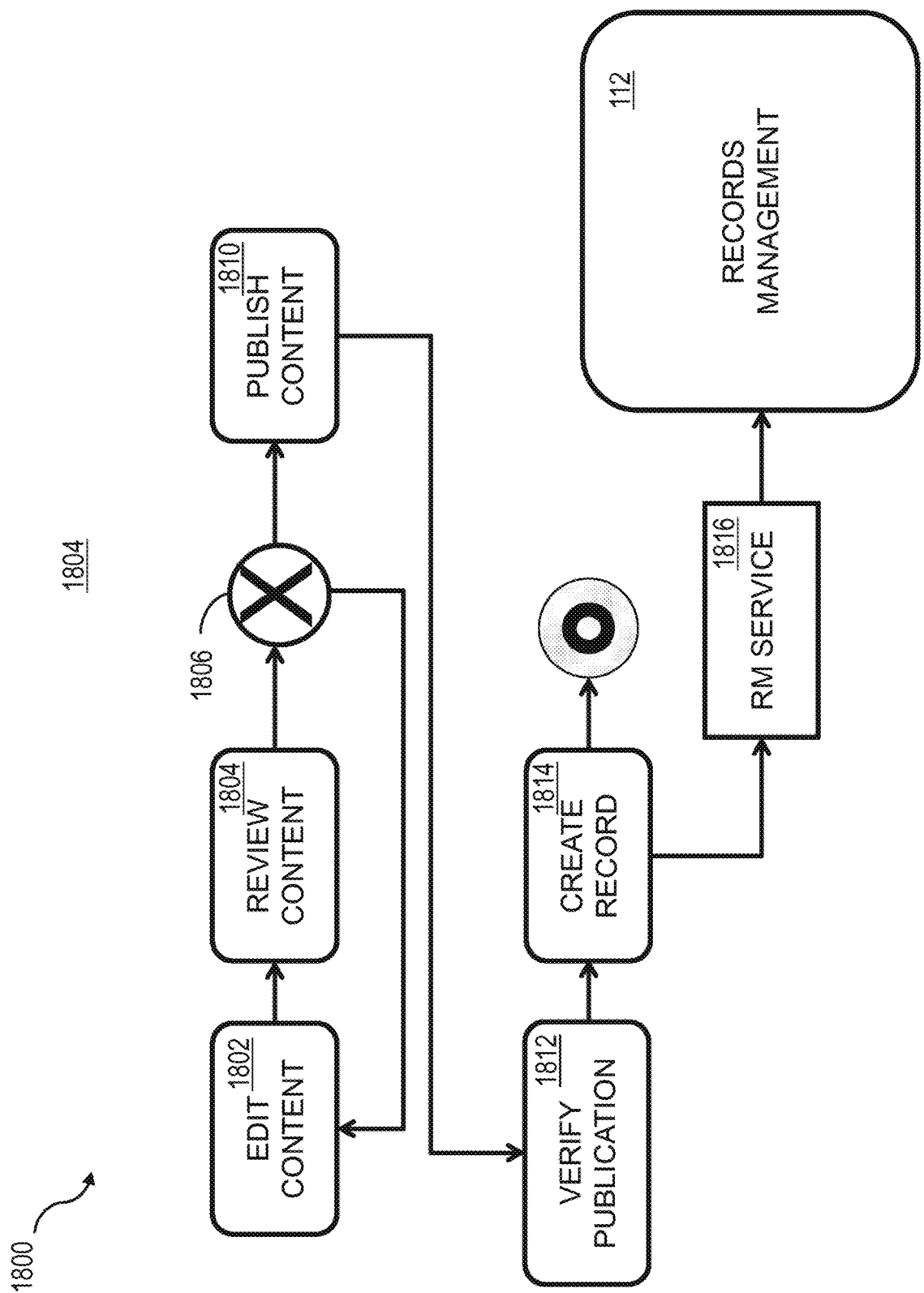
FIG. 18 shows a diagram illustrating how a content workflow can result in declaration of a record consistent with implementations of the current subject matter.
Figure 19:
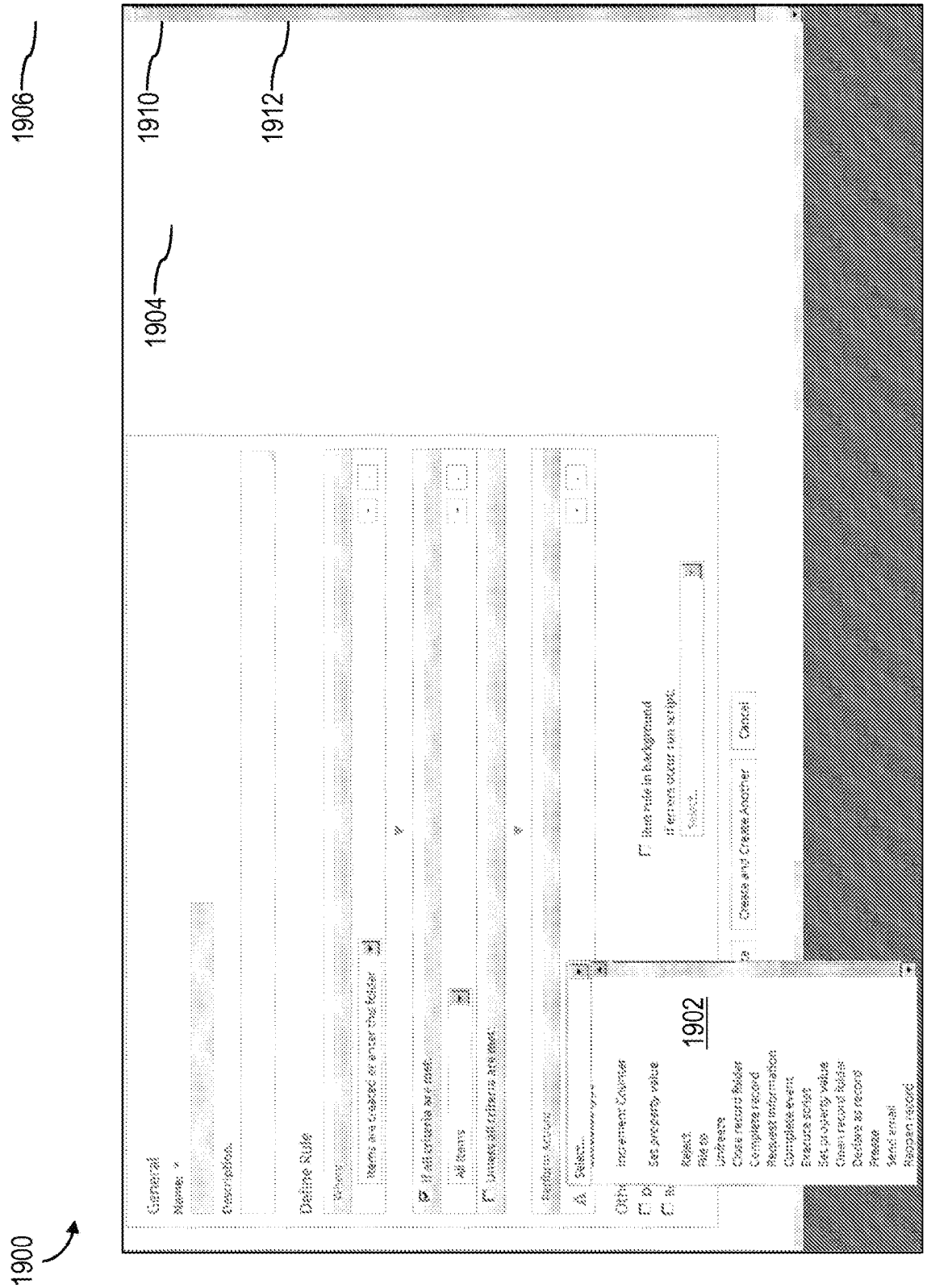
FIG. 19 shows a screenshot illustrating features of a user interface for defining and modifying record declaration rules consistent with implementations of the current subject matter.

FIG. 18 shows a diagram 1800 illustrating features of a general workflow that can result in automated designation of a record. Content can be generated and/or edited at 1802 within a first file structure 104 (not shown in FIG. 18) and reviewed at 1804. The workflow can include an approval point 1806, which can result in editing and reviewing being repeated. At 1810, the content is published, and the publication is verified at 1812. The workflow can have associated with it a rule that causes the content to be declared automatically as a record at 1814 upon verification of publication at 1812. The declared record can be routed to a records management service 1816, which can optionally request additional metadata and/or route the new record to a file plan 402 (not shown in FIG. 18) or to an unfiled records folder (discussed below) in a records management site 112.

Figure 20:
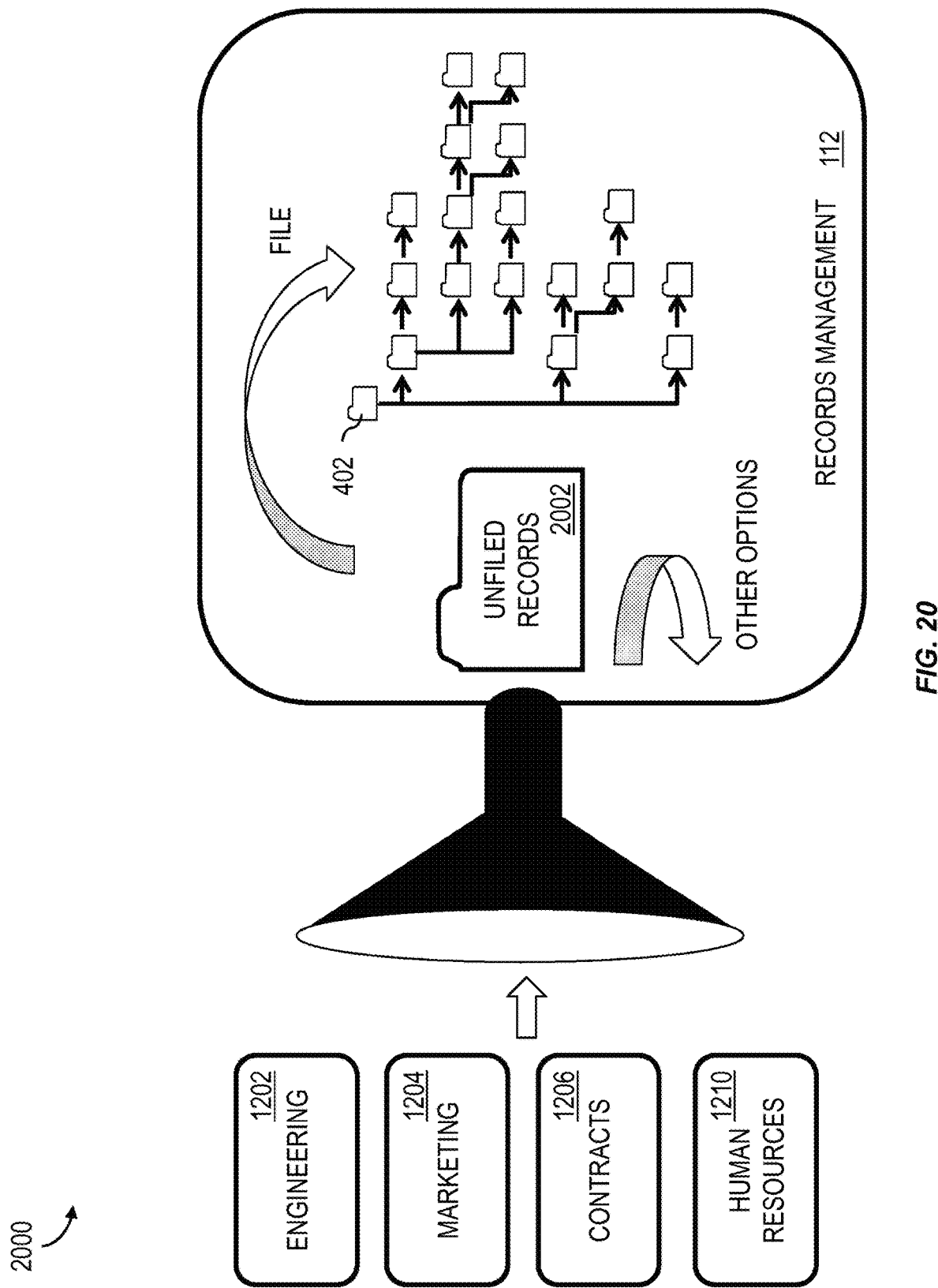
FIG. 20 shows a diagram illustrating features of an unfiled records folder consistent with implementations of the current subject matter.

FIG. 20 shows a screenshot 1900 illustrating an example of user interface features that can facilitate configuration of record declaration rules based on user actions. Actions can be selected from a pulldown menu 1902 (or other user interface feature), and these actions can be performed when other defined criteria are met, for example if specific events occurs or a time-based criteria is met.

The current subject matter also includes features relating to handling of records once they are declared. FIG. 20 shows a diagram 2000 illustrating an approach to handling declared records. In this example, the sharing sites 1202, 1204, 1206, 1210 discussed above in reference to FIG. 12 are reproduced along with the records management site 112. The records management site includes a complex file plan 402 with numerous records categories, records folders, etc. While some previously available approaches have relied upon members of a records management team to assign incoming records to various parts of a records management filing structure, the current subject matter allows useful automation of many aspects of these tasks. One advantageous feature that can appear in some implementations of the current subject matter is an "unfiled records" folder 1802 into which a newly declared record is placed by default unless some other specific designation is associated with the record. In effect, incoming records are "funneled" into the unfiled records folder 2002. From the unfiled records folder 2002, records can be filed into appropriate locations in the file plan 402, and/or one or more other optional actions can occur.

The unfiled records folder 2002 serves as an intermediate location for the record before it is assigned a location in the file plan. From the unfiled records folder, the record can be filed into the file plan, or one or more other actions can be performed, such as for example one or more of completing the record, adding additional metadata, requesting more information from the user (e.g. initiating a workflow to request that the user who declared the record provides more information about his or her intent in declaring the record), rejecting creation of the record, and the like. One or more rules can be defined for the unfiled records folder 2002, and these rules can determine how a newly declared record is inserted into the file plan 402 or whether other actions are performed as described in this paragraph. In some examples, the rules can include definition of a dynamic file path based on one or more attributes of the record.

Figure 21:
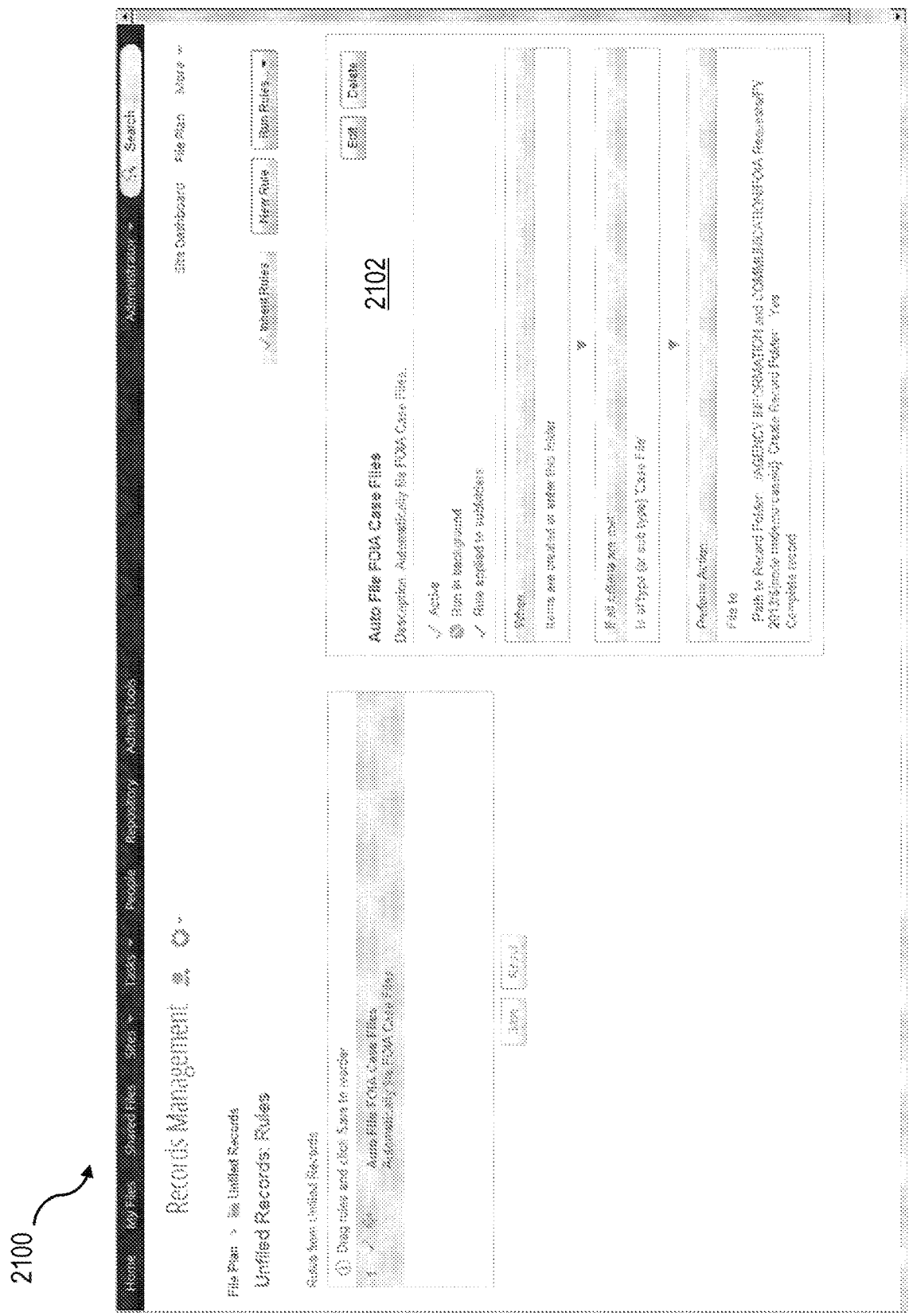
FIG. 21 and FIG. 22 show screenshots illustrating features of a user interface for defining and modifying rules for handling of records consistent with implementations of the current subject matter.

FIG. 21 shows a screenshot 2100 illustrating examples of some user interface features relating to filing of records from the unfiled records folder 2002. A rule definition 2102 can include evaluation of criteria as well as actions to be performed. In this example, a file path to which a record is to be assigned can include both fixed path and configurable path information. The configurable path information can be substitutable based on evaluation of the content object 300 of the declared record. For example, the original object metadata 304 and/or the record tag 306 and/or the optional additional record metadata 310 can be evaluated to determine a dynamic path into which the record should be directed. In some implementations of the current subject matter, the actual content 302 of the content object 300 can be evaluated to extract information to be used in determining the file path. A non-limiting example of a file path that includes both fixed path and configurable path information can designate a fixed file path part referencing a contracts folder and a configurable path that dynamically references appropriate nested sub-folders for calendar year and month. The values for the calendar year and month can optionally be evaluated from content and/or metadata associated with the record. For example, the content can be evaluated to determine whether a signing date is included in the document that was designated as a record. Alternatively, metadata (e.g. original object metadata 304, a record tag 306, and/or optional additional record metadata can be evaluated to determine a last saved date or the like.

Figure 22:
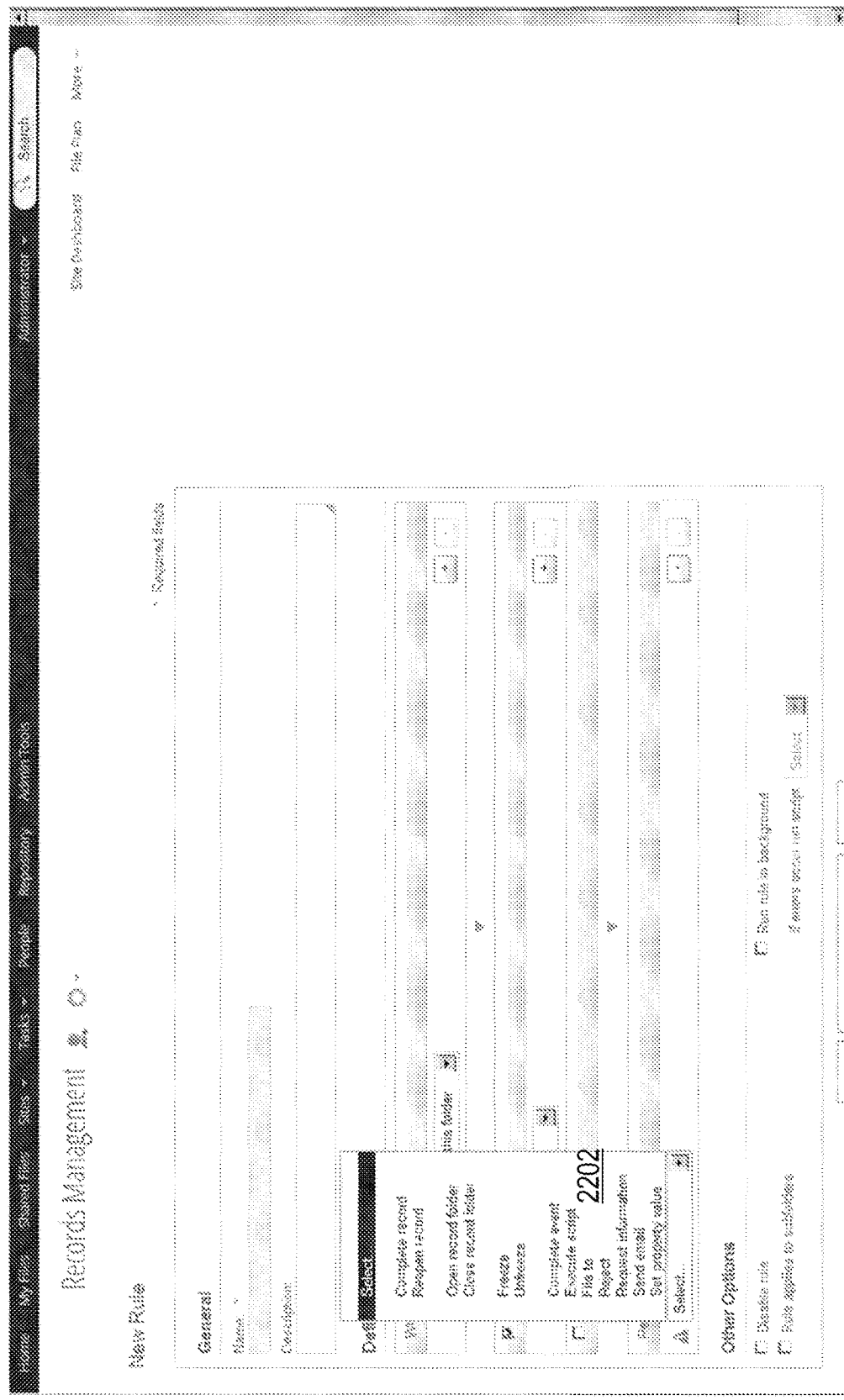

FIG. 22 shows a screenshot 2200 illustrating examples of some additional user interface features relating to filing of records from the unfiled records folder 2002. In this example, a pulldown menu 2202 or other user interface feature can provide options for determining actions to take based on evaluated attributes of a declared record.

Figure 23:
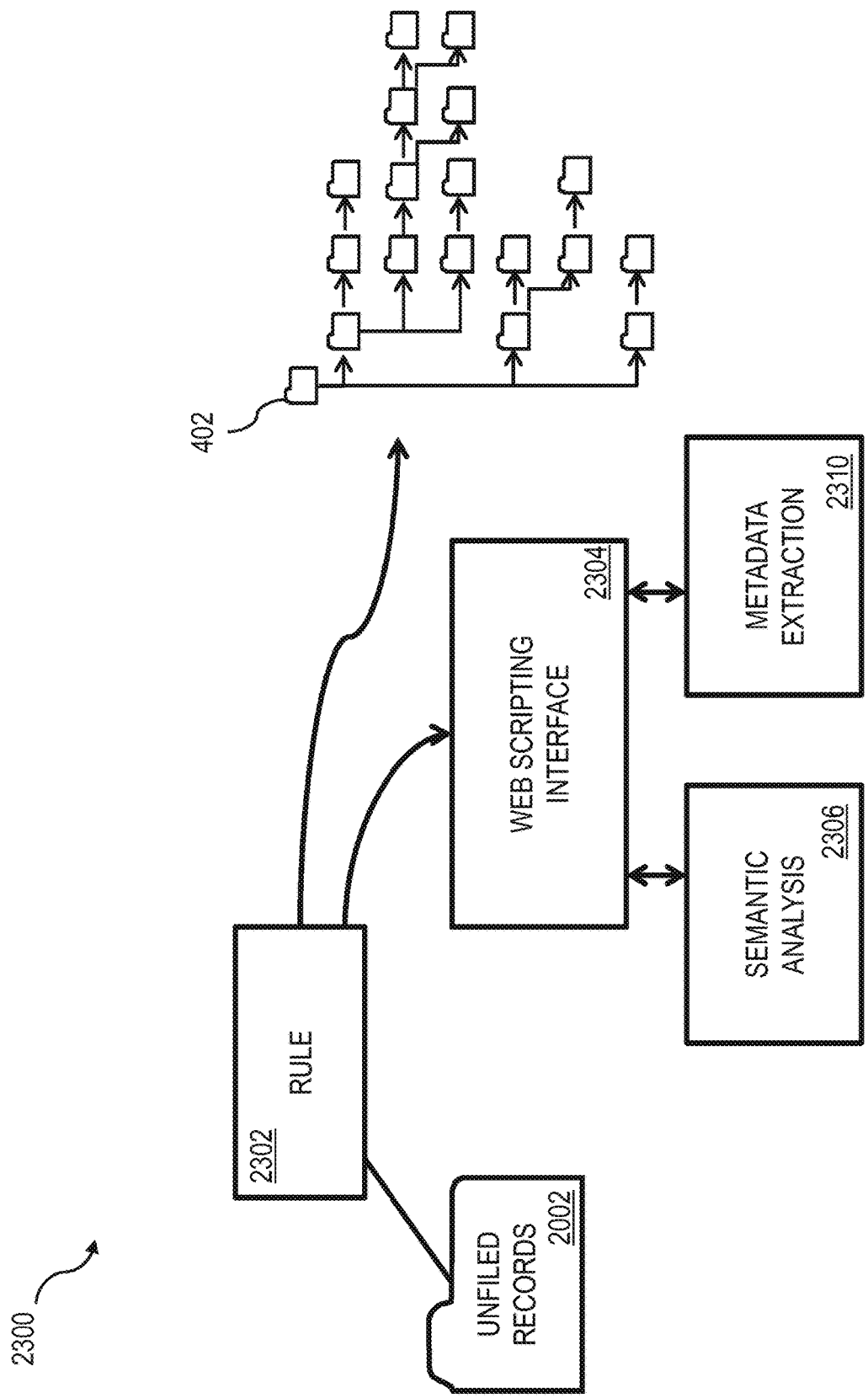
FIG. 23 shows a diagram illustrating features of rule interactions with the unfiled records folder and other inputs constant with implementations of the current subject matter.

FIG. 23 shows a diagram 2300 illustrating features relating to handling of records in an unfiled records folder 2002. One or more rules (e.g. a set of rules 2302) can be applied to the records for determining filing locations in the file plan 402. Certain rules can invoke execution of one or more web scripts (e.g. pieces of executable code) based on events, user actions relating to record declaration or other actions taken on the document or the record resulting from declaration of the document as a record, or the like. The one or more webscripts can be executed via an application programing interface such as for example a web scripting interface 2304, and can invoke operations such as semantic analysis, metadata extraction, and the like. The outputs of these web scripts can be appended to the record as additional optional record metadata. Alternatively or in addition, the web script output (s) can be used in dynamic file path definitions, for creation of new rules, new folders or other file structures in the file plan 402, or the like.

Figure 24:
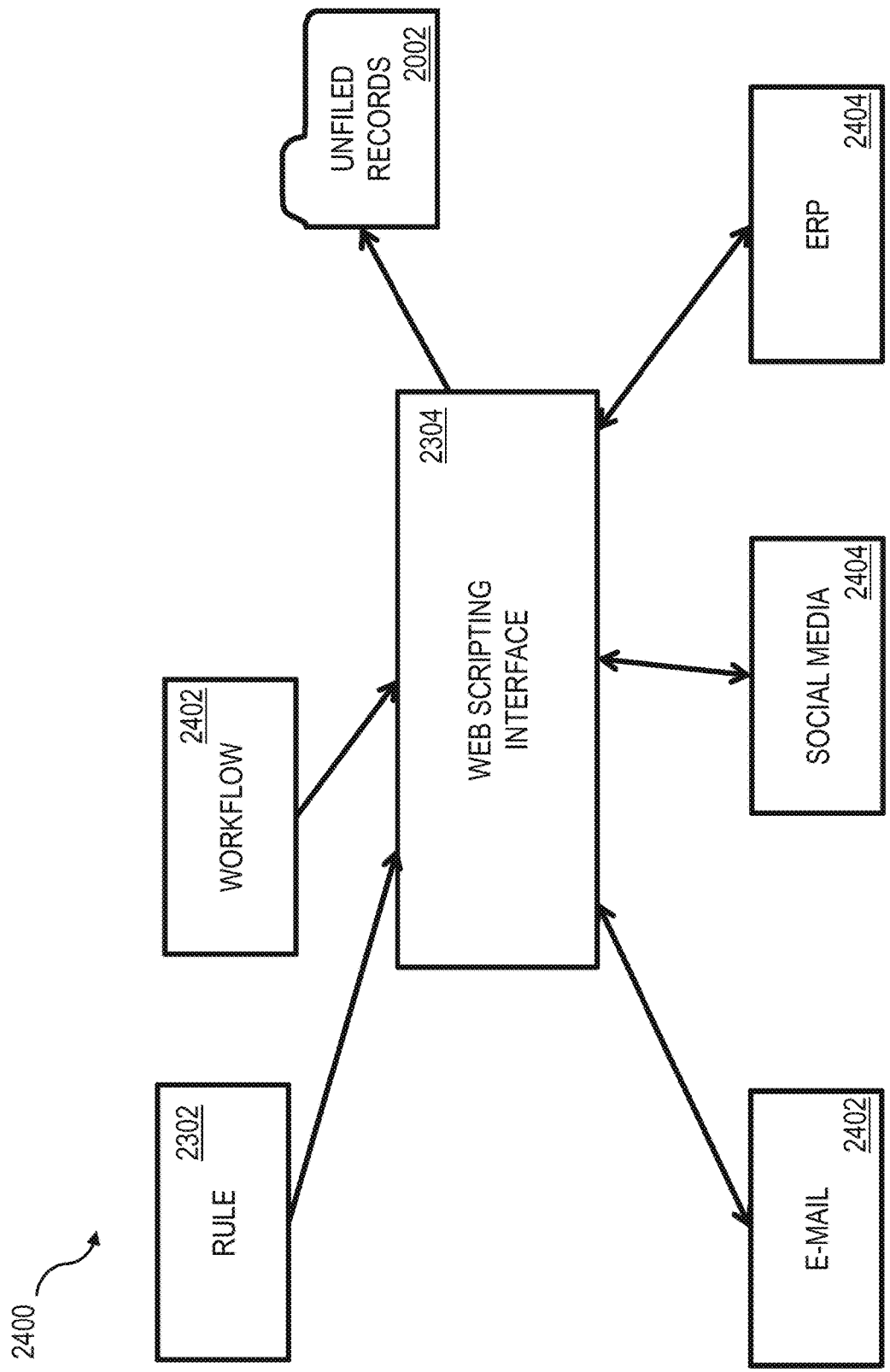
FIG. 24 shows a diagram illustrating features of a webs crippling interface for records handling consistent with implementations of the current subject matter.

FIG. 24. shows a diagram 2400 illustrating features relating to creation of record content for inclusion in a records management system consistent with implementations of the current subject matter. Rules 2302 and/or workflows 2402 can implement features of a web scripting interfaces, which can in turn access and be capable of extracting data from other systems or applications external to a content management system 304 and/or sharing sites. Examples of external systems or programs can include e-mail servers or applications 2404, social media servers or applications 2406, enterprise resource planning (ERP) servers or applications 2410, and the like. Content extracted from these external sources can be routed to an unfiled records folder 2002 for further processing consistent with implementations of the current subject matter.

Figure 25:
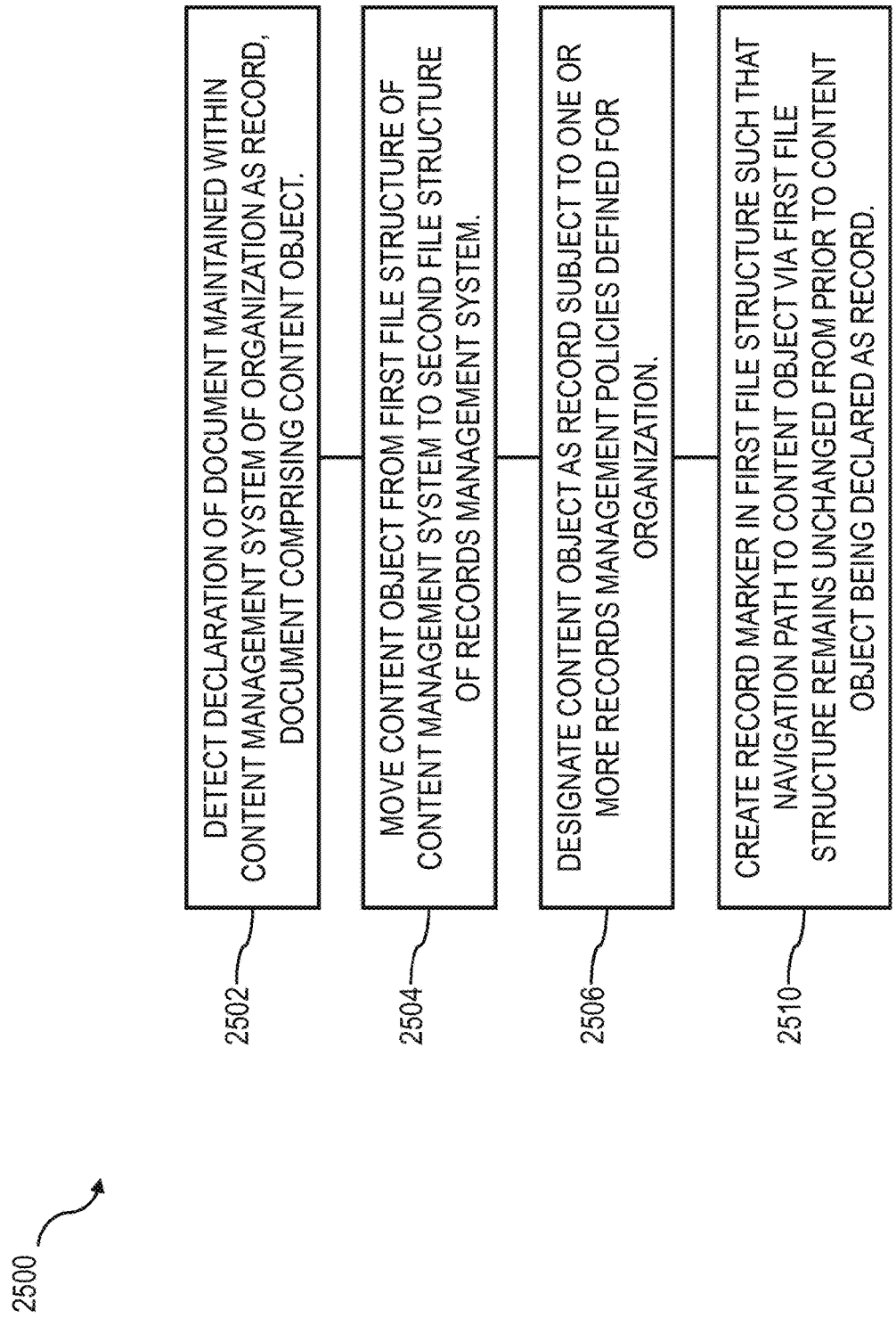
FIG. 25-27 show process flow diagrams illustrating aspects of method having one or more features consistent with implementations of the current subject matter.

FIG. 25 shows a process flow diagram illustrating features of a method consistent with implementations of the current subject matter. At 2502, a content object maintained within a content management system of an organization is declared as a record, for example by a user manually declaring the record or by one or more automated processes consistent with the descriptions herein. The content object is moved from a first file structure of the content management system to a second file structure of a records management system at 2504 where the content object is designated as a record subject to records management policies defined for the organization at 2506. A record marker is created at 2510 in the first file structure such that a navigation path to the content object via the first file structure remains unchanged from prior to the content object being declared as a record.

A record tag can be added to the content object, and optionally additional record metadata are also added. User permissions for access to the content object now declared as the record can be maintained subject to original permissions within the content management system augmented with one or more records management policies.

Figure 26:
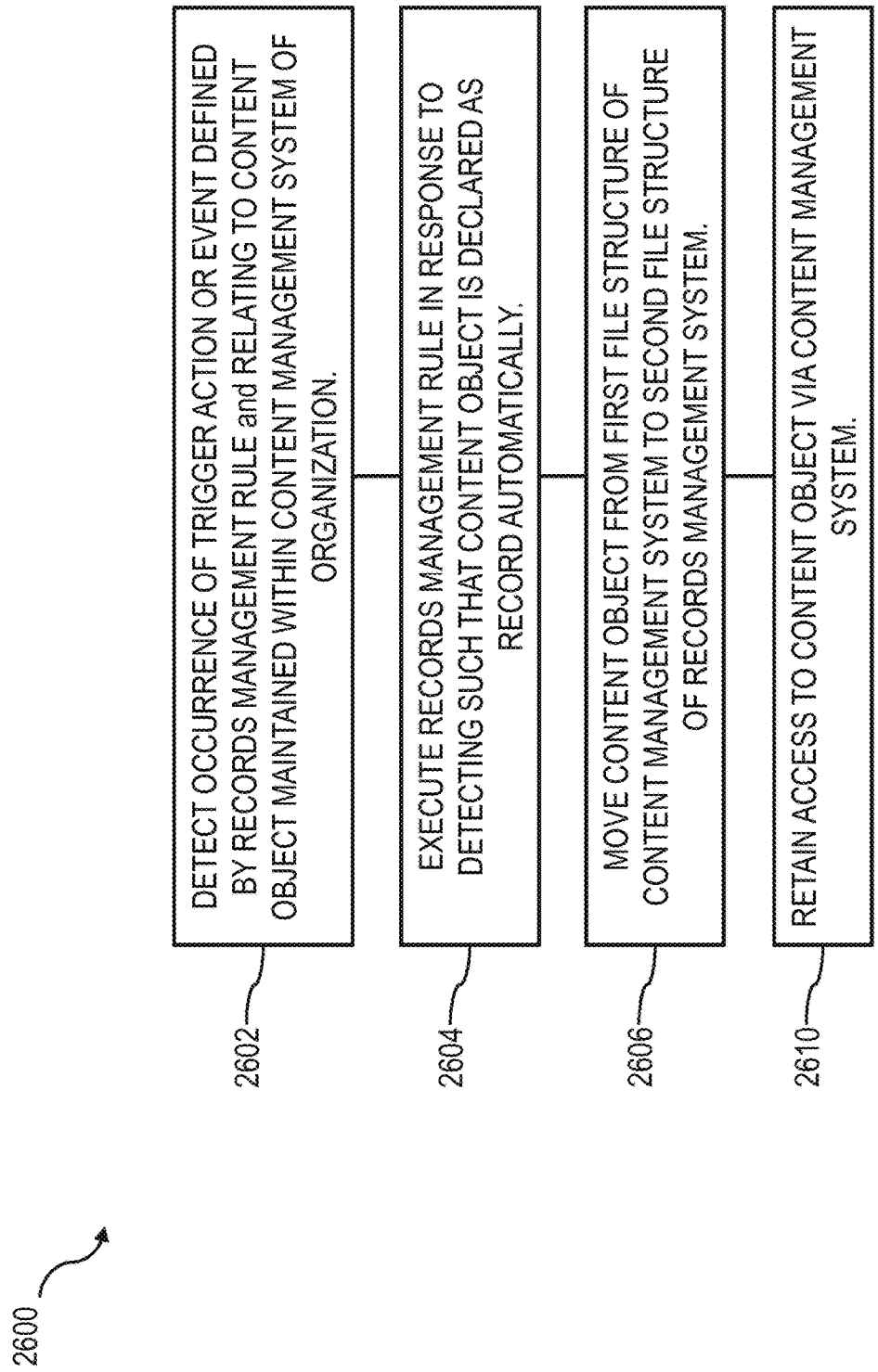

FIG. 26 shows a process flow diagram 2600 illustrating features of a method consistent with implementations of the current subject matter. At 2602 an occurrence of a trigger action or event relating to a content object maintained within a content management system of an organization is detected. The trigger action or event is defined in a records management rule. The rule is executed at 2604 such that the content object is declared as a record. At 2606, the content object is moved from a first file structure of the content management system to a second file structure of a records management system, while access to the content object via the content management system is retained at 2610.

In some implementations, retaining access to the content object via the content management system includes creating a record marker in the first file structure such that a navigation path to the content object via the first file structure remains unchanged from prior to the content object being declared as a record. In other implementations, the moving of the content object includes changing a primary association for the content object to a new location in the second file structure, and the retaining of access to the content object includes creating a secondary association for the content objection to an original location of the content object in the first file structure.

Figure 27:
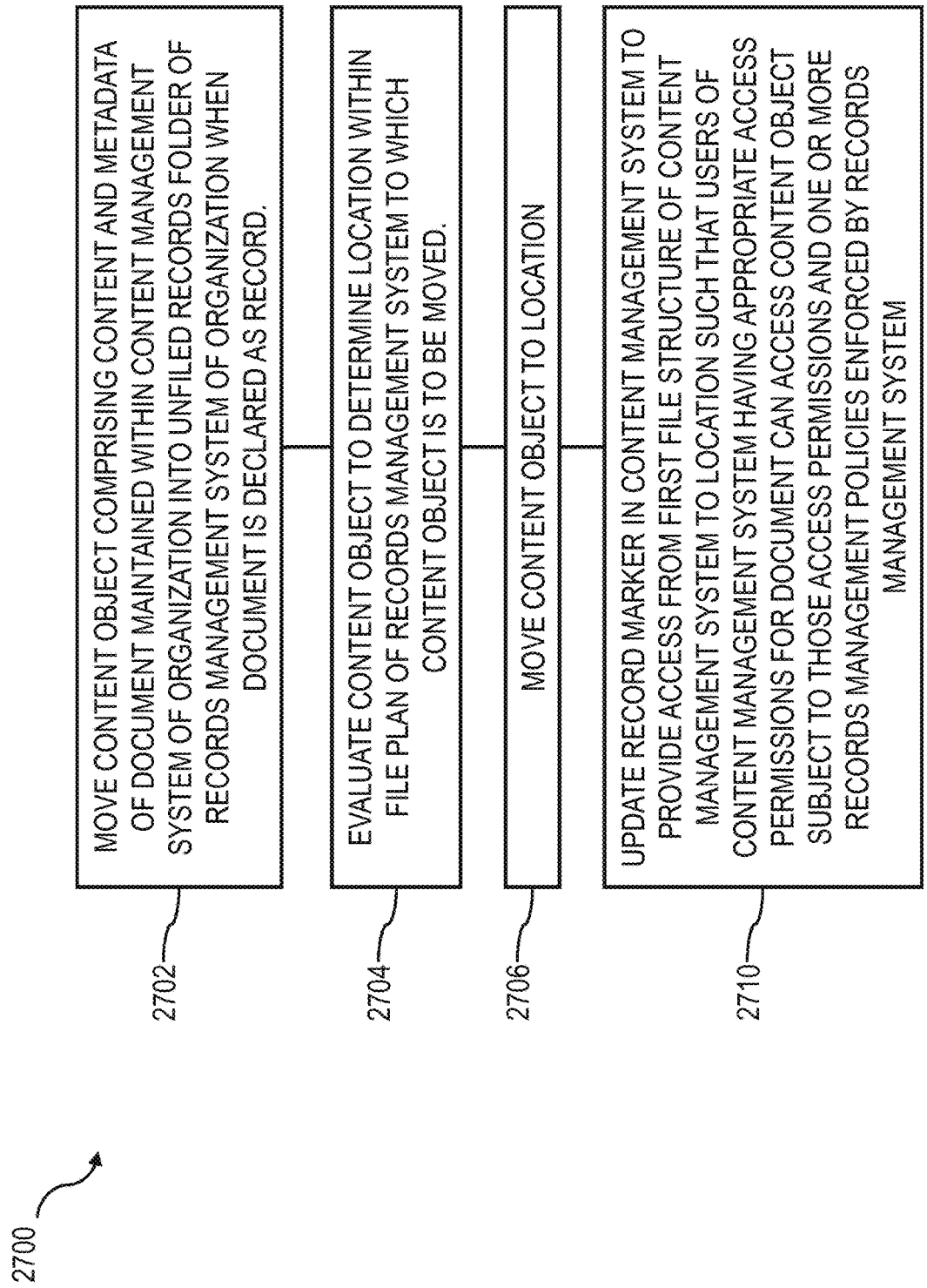

FIG. 27 shows a process flow diagram 2700 illustrating features of a method consistent with implementations of the current subject matter. At 2702, a content object that includes content and metadata of a document maintained within a content management system of an organization is moved into an unfiled records folder of a records management system after the document has been declared as a record. The content object is evaluated at 2704 to determine a location within a file plan of the records management system to which the content object is to be moved. The evaluating can include one or more of execution of a rule, semantic analysis of content of the content object, extraction of metadata of the content object, and the like. At 2706, the content object is moved to the location, and at 2710, a record marker in the content management system is updated to provide access from a first file structure of the content management system to the location such that users of the content management system having appropriate access permissions for the document can access the content object subject to those access permissions and one or more records management policies.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on,"

above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine- readable storage medium storing instructions the instructions, when executed by at least one programmable processor, cause the at least one programmable processor to perform operations comprising:

causing a content object to undergo one or more modifications initiated by one or more users of a content management system during a workflow process involving one or more actions performed by a user of the content management system, the content object comprising content and metadata of a document maintained by the content management system within a first file structure, the first file structure of the content management system providing, based on a first set of permissions, a first level of access to the document for the one or more users of the content management system;

assigning a location for the content obj ect within a file plan of a records management system, in response to detecting a declaration of the document as a record, the declaration being automatically generated in response to a rule invoked in an instance that the user of the content management system interacts with a user interface menu, the rule including a definition of a navigation path from the first file structure in the content management system to a location in a second file structure in the records management system, the content management system being distinct from the records management system;

forwarding a notification about the declaration of the document to the records management system;

moving the content object from the first file structure to the location in the second file structure;

creating, in response to the moving, a record marker in the first file structure, the record marker identifying the navigation path from the first file structure to the location of the content object in the second file structure; and providing, for the one or more users of the content management system and via the record marker, a second level of access to the content obj ect at the second location as defined in the file plan, the second level of access comprising a second set of permissions for accessing the document from within the first file structure via a user interface of the content management system, the second set of permissions being more limited than the first set of permissions.

2. The computer program product as in claim 1, wherein the notification comprises at least one of a link to the location of the record, a first option to request more information about the record from the one or more users, and a second option to reject the record.

3. The computer program product as in claim 1, wherein the operations further comprise changing the user interface of the content management system after detecting the declaration of the document as the record, the changing of the user interface comprising a display of information relating to the content object in the user interface including a unique record identifier and an icon visually depicting that the document has been declared as the record.

4. The computer program product as in claim 3, wherein the changing of the user interface further comprises removing one or more previously available actions available to the one or more users with respect to the document in the content management system, the one or more actions comprising the ability to edit the document.

5. The computer program product as in claim 1, wherein the operations further comprise originating the content object as the document, the originating comprising at least one of creation of a new document, copying of an existing document or importing of an existing document from another system into the first file structure of the content management repository.

6. The computer program product as in claim 1, wherein prior to the assigning of the location, the operations further comprise:

holding the record in an unfiled records folder; and
   performing one or more other actions comprising at least one of completing the record, adding additional metadata, requesting more information from the one or more users, and rejecting the record.

7. The computer program product as in claim 1, wherein the operations further comprise maintaining user permissions for access to the content object subject to an original set of permissions within the content management system modified by one or more records management policies applied to the content object as a result of designation of the content object as the record.

8. The computer program product as in claim 1, wherein the declaration of the document as the record comprises at least one of a manual declaration received via a user interaction with a user interface of the content management system or an automated declaration resulting from occurrence of a trigger event or action defined by a rule.

9. The computer program product as in claim 1, wherein the content management system and the records management system are separated by a firewall.

10. A computer-implemented method, wherein a content object is modifiable by one or more users of a content management system, the content object comprising content and metadata of a document maintained by the content management system within a first file structure, the first file structure of the content management system providing, based on a first set of permissions, a first level of access to the document for the one or more users of the content management system, the first level of access comprising an ability to edit the content object, the method comprising:

providing the first level of access to the document within the first file structure for the one or more users of the content management system;
   assigning a location for the content obj ect within a file plan of a records management system, in response to detecting a declaration of the document as a record, the declaration including a definition of a navigation path from the first file structure in the content management system to a location in a second file structure in the records management system;

moving the content object from the first file structure to the location in the second file structure;

creating, in response to the moving, a record marker in the first file structure, the record marker identifying the navigation path from the first file structure to the location of the content object in the second file structure; and providing, for the one or more users of the content management system and via the record marker, a second level of access to the content obj ect at the second location as defined in the file plan, the second level of access comprising a second set of permissions for accessing the document from within the first file structure via a user interface of the content management system, the second set of permission being more limited than the first set of permissions.

11. The computer-implemented method as in claim 10, wherein a notification about the declaration of the document as a record is forwarded to the records management system, the notification comprises at least one of a link to the location of the record, a first option to request more information about the record from the one or more users, and a second option to reject the record.

12. The computer-implemented method as in claim 10, further comprising changing the user interface of the content management system after detecting declaration of the document as a record, the changing of the user interface comprising a display of information relating to the content object in the user interface including a unique record identifier and an icon visually depicting that the document has been declared as the record.

13. The computer-implemented method as in claim 12, wherein the changing of the user interface further comprises removing one or more previously available actions available to the one or more users with respect to the document in the content management system, the one or more actions comprising the ability to edit the document.

14. The computer-implemented method as in claim 10, further comprising originating the content object as the document, the originating comprising at least one of creation of a new document, copying of an existing document or importing of an existing document from another system into the first file structure of the content management repository.

15. The computer-implemented method as in claim 10, wherein prior to the assigning of the location, the method further comprises:
holding the record in an unfiled records folder; and
performing one or more other actions comprising at least one of completing the record, adding additional metadata, requesting more information from the one or more users, and rejecting the record.

16. The computer-implemented method as in claim 10, further comprising maintaining user permissions for access to the content object subject to an original set of permissions within the content management system modified by one or more records management policies applied to the content object as a result of designation of the content object as the record.

17. The computer-implemented method as in claim 10, wherein the declaration of the document as the record comprises at least one of a manual declaration received via a user interaction with a user interface of the content management system or an automated declaration resulting from occurrence of a trigger event or action defined by a rule.

18. The computer-implemented method as in claim 10, wherein the declaration of the document as the record comprises the content management system and the records management system are separated by a firewall.

19. A system comprising:
computer hardware comprising a programmable processor and a machine-readable storage medium storing instructions, the instructions, when executed by the programmable processor, causing the programmable processor to perform operations comprising:
causing a content object to undergo one or more modifications initiated by one or more users of a content management system during a workflow process involving one or more actions performed by a user of the content management system, the content object comprising content and metadata of a document maintained by the content management system within a first file structure, the first file structure of the content management system, based on a first set of permissions, providing a first level of access to the document for the one or more users of the content management system;
providing the first level of access to the document within the first file structure for the one or more users of the content management system;
assigning a location for the content obj ect within a file plan of a records management system in response to detecting a declaration of the document as a record, the declaration including a definition of a navigation path from the first file structure in the content management system to a location in a second file structure in the records management system;
moving the content object from the first file structure to the location in the second file structure;
creating, in response to the moving, a record marker in the first file structure, the record marker identifying the navigation path from the first file structure to the location of the content object in the second file structure; and
providing, for the one or more users of the content management system and via the record marker, a second level of access to the content obj ect at the second location as defined in the file plan, the second level of access comprising a second set of permissions for accessing the document from within the first file structure via a user interface of the content management system, the second set of permission being more limited than the first set of permissions.

20. The system of claim 19, further comprising:
providing, for the one or more users of the content management system and via the record marker, a second level of access to the content object at the location in the file plan, the second level of access comprising a view permission for the document from within the first file structure via a user interface of the content management system, the second level of access excluding the ability to edit the content object from the file plan of the records management system;
detecting a movement of the content object within the records management system to a second location; and
updating, in response to detecting the movement, the record marker to identify a second navigation path from the first file structure to the second location, wherein the content management system and the records management system are separated by a firewall.

* * * * *